US008615046B2

(12) United States Patent
Miki et al.

(10) Patent No.: US 8,615,046 B2
(45) Date of Patent: Dec. 24, 2013

(54) MOBILE COMMUNICATION SYSTEM, TRANSMISSION APPARATUS, RECEIVING APPARATUS AND METHOD

(75) Inventors: Nobuhiko Miki, Yokohama (JP); Teruo Kawamura, Yokosuka (JP); Kenichi Higuchi, Saitama (JP); Mamoru Sawahashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 236 days.

(21) Appl. No.: 13/058,750

(22) PCT Filed: Aug. 3, 2009

(86) PCT No.: PCT/JP2009/063742
§ 371 (c)(1),
(2), (4) Date: Apr. 20, 2011

(87) PCT Pub. No.: WO2010/018761
PCT Pub. Date: Feb. 18, 2010

(65) Prior Publication Data
US 2011/0188585 A1   Aug. 4, 2011

(30) Foreign Application Priority Data
Aug. 11, 2008   (JP) ................................ 2008-207488

(51) Int. Cl.
*H04L 27/00* (2006.01)
(52) U.S. Cl.
USPC ........................... 375/259; 375/295; 375/316
(58) Field of Classification Search
USPC ...................... 370/328–329, 338, 341, 395.4; 455/450–452.2; 375/259–260, 295, 375/316
See application file for complete search history.

(56) References Cited

U.S. PATENT DOCUMENTS

| | | | | |
|---|---|---|---|---|
| 2007/0171864 | A1* | 7/2007 | Zhang et al. | 370/329 |
| 2007/0237248 | A1* | 10/2007 | Jung et al. | 375/260 |
| 2008/0212464 | A1* | 9/2008 | Kim et al. | 370/210 |
| 2009/0180459 | A1* | 7/2009 | Orlik et al. | 370/344 |
| 2009/0196249 | A1 | 8/2009 | Kawamura et al. | |
| 2009/0202008 | A1* | 8/2009 | Suzuki | 375/260 |
| 2010/0128675 | A1* | 5/2010 | Kishiyama et al. | 370/328 |

FOREIGN PATENT DOCUMENTS

WO   2007/148583 A1   12/2007
WO   2008/093644 A1   8/2008

OTHER PUBLICATIONS

International Search Report w/translation from PCT/JP2009/063742 dated Nov. 2, 2009 (2 pages).
3GPP TSG RAN WG Meeting #47bis, R1-070103; "Downlink L1/L2 Control Signaling Channel Structure: Coding"; NTT DoCoMo, et al.; Sorrento, Italy; Jan. 15-19, 2007 (17 pages).

(Continued)

*Primary Examiner* — Jean B Corrielus
(74) *Attorney, Agent, or Firm* — Osha Liang LLP

(57) ABSTRACT

A transmission apparatus for transmitting an uplink control signal by using a predetermined number of basic frequency blocks in a plurality of basic frequency blocks, wherein a system band is divided into a plurality of bands by a basic frequency block having a predetermined bandwidth, includes: a mapping unit configured to map control information to subcarriers in a basic frequency block in a given subframe; an inverse Fourier transform unit configured to perform inverse Fourier transform on a signal to which the control information is mapped; and a radio transmission unit configured to transmit a transmission signal, to a receiving apparatus by radio, including a signal on which inverse Fourier transform has been performed. In a subframe subsequent to the given subframe, the mapping unit maps the control information to subcarriers in a basic frequency block of a band different from a band of the basic frequency block in the given subframe.

16 Claims, 13 Drawing Sheets

(56) References Cited

OTHER PUBLICATIONS

3GPP TS 36.211 V8.2.0.; "3rd Generation Partnership Project; Technical Specification Group Radio Access Network; Evolved Universal Terrestrial Radio Access (E-UTRA); Physical Channels and Modulation"; Mar. 2008 (65 pages).

Office Action in corresponding Japanese application No. 2008-207488 mailed May 21, 2013 (4 pages).

NTT DoCoMo, Inc.; "Proposals for LTE-Advanced Technologies"; 3GPP TSG RAN WG1 Meeting #53, R1-081948; Kansas City, USA; May 5-9, 2008 (15 pages).

* cited by examiner

FIG.12

| | METHOD 1 | METHOD 2 | METHOD 3 |
|---|---|---|---|
| FREQUENCY DIVERSITY | EQUAL TO Rel-8 LTE | SUPERIOR TO METHOD 1 SINCE PERFORM HOPPING WITH BAND LARGER THAN METHOD 1, SUPERIOR TO Rel-8 LTE | SUPERIOR TO Rel-8 LTE |
| OTHER CELL INTERFERENCE | INTERFERENCE RANDOMIZE EFFECT DUE TO inter-TTI HOPPING BETWEEN BASIC FREQUENCY BLOCKS, SUPERIOR TO Rel-8 LTE | EQUAL TO Rel-8 LTE | EQUAL TO Rel-8 LTE |
| PAPR | EQUAL TO Rel-8 LTE | EQUAL TO Rel-8 LTE | LARGER THAN METHODS 1 AND 2 DUE TO MC TRANSMISSION |
| MULTIPLEXING IN THE SAME RESOURCE WITH Rel-8 LTE TERMINAL | MOST FLEXIBLE MULTIPLEXING AVAILABLE SINCE HAVING CONFIGURATION THE SAME AS Rel-8 LTE IN TERMS OF EACH BASIC FREQUENCY BLOCK UNIT | MULTIPLEXING AVAILABLE. WHEN THE NUMBER OF LTE-Advanced TERMINALS IS LARGE, USE EFFICIENCY OF BAND CENTER RESOURCE DETERIORATES | MULTIPLEXING AVAILABLE WHEN USING Multicarrier DFT-Spread OFDM USING DFTS. TDMA OR FDMA IS NECESSARY WHEN USING OFDM OR Clustered DFT-Spread OFDM |
| INFORMATION AMOUNT SENDABLE PER TTI/TIME REQUIRED FOR TRANSMITTING CONTROL INFORMATION OVER MULTIPLE BASIC FREQUENCY BLOCKS | SENDABLE INFORMATION AMOUNT PER TTI IS EQUAL TO Rel-8 LTE. THUS, MULTIPLE TTIs ARE NECESSARY FOR TRANSMISSION OF CONTROL INFORMATION OVER MULTIPLE BASIC FREQUENCY BLOCKS. A METHOD CAN BE CONSIDERED FOR CODING CONTROL INFORMATION OF BASIC FREQUENCY BLOCK IN UNITS OF SLOT TO REDUCE TTI | SENDABLE INFORMATION AMOUNT PER TTI IS EQUAL TO Rel-8 LTE. THUS, MULTIPLE TTIs ARE NECESSARY FOR TRANSMISSION OF CONTROL INFORMATION OVER MULTIPLE BASIC FREQUENCY BLOCKS. A METHOD CAN BE CONSIDERED FOR CODING CONTROL INFORMATION OF BASIC FREQUENCY BLOCK IN UNITS OF SLOT TO REDUCE TTI | DUE TO MC TRANSMISSION, INFORMATION AMOUNT LARGER THAN Rel-8 LTE CAN BE TRANSMITTED PER TTI. THUS, CONTROL INFORMATION CAN BE TRANSMITTED IN SHORTER TIME THAN METHOD 1 AND 2. BY THE AMOUNT, RADIO RESOURCES PER TTI BECOME LARGER COMPARED TO METHOD 1 AND 2 |

MOBILE COMMUNICATION SYSTEM, TRANSMISSION APPARATUS, RECEIVING APPARATUS AND METHOD

CROSS-REFERENCE TO RELATED APPLICATIONS

The present application claims priority based on Japanese patent application No. 2008-207488, filed in the JPO on Aug. 11, 2008, and the entire contents of the Japanese patent application No. 2008-207488 is incorporated herein by reference.

TECHNICAL FIELD

The present invention generally relates to the technical field of mobile communications. More particularly, the present invention relates to a mobile communication system, a base station, a transmission apparatus, a receiving apparatus and a method employing next-generation mobile communication technologies.

BACKGROUND ART

In ITU-R (International Telecommunication Union Radio communication sector), call for proposals of IMT-Advanced radio interfaces has started, and standardization works have started aiming to completing specifications in 2011.

With that, in 3GPP (3rd Generation Partnership Project), study of LTE-Advanced is starting as an advanced system of LTE Release 8 (to be referred to as Rel-8 LTE hereinafter).

In this kind of communication systems, one or more resource blocks (RB) are assigned to a user apparatus both in downlink and uplink communications. Resource blocks are shared by multiple user apparatuses in the system. The base station apparatus determines a user apparatus to which a resource block is to be assigned from among a plurality of user apparatuses every subframe that is 1 ms, for example. The subframe may also be called a transmission time interval (TTI). The determination of assignment of radio resources is called scheduling. In downlink, the base station apparatus transmits a shared channel using one or more resource blocks to a user apparatus selected in the scheduling. This shared channel may be called a physical downlink shared channel (PDSCH). In uplink, a user apparatus selected in the scheduling transmits a shared channel to the base station apparatus using one or more resource blocks. This shared channel may be called a physical uplink shared channel (PUSCH).

When scheduling of radio resources is performed, it is necessary to signal (or report) assignment information indicating which user apparatus is assigned the shared channel basically every subframe. A downlink control channel used for this signaling is called a physical downlink control channel (PDCCH) or a downlink L1/L2 control channel (DL-L1/L2 Control Channel). The PDCCH, for example, includes the following information (see, for example, non-patent document 1):

Downlink scheduling information
Uplink scheduling grant
Acknowledgment information (ACK/NACK: Acknowledgment/Negative-Acknowledgment information)
Transmission power control command bit The downlink scheduling information may include information regarding a downlink shared channel. More specifically, the downlink scheduling information may include downlink resource block assignment information, identification information of user apparatus (UE IDs), the number of streams, information regarding precoding vectors, data sizes, modulation schemes, and information regarding hybrid automatic repeat request (HARQ).

The uplink scheduling grant includes, for example, information regarding an uplink shared channel. More specifically, the uplink scheduling grant may include uplink resource assignment information, identification information of user apparatus (UE IDs), data sizes, modulation schemes, uplink transmission power information, and information regarding a demodulation reference signal used in uplink MIMO.

The acknowledgement information (ACK/NACK) indicates whether retransmission is necessary for PUSCH transmitted in uplink.

In uplink, the PUSCH is used to transmit user data (i.e., a normal data signal). Also, separately from the PUSCH, a physical uplink control channel (PUCCH) is provided to transmit, for example, a downlink channel quality indicator (CQI) and acknowledgement information (ACK/NACK) for the PDSCH. The CQI is used, for example, for scheduling and adaptive modulation and channel coding (AMC) of the physical downlink shard channel. In uplink, a random access channel (RACH) and signals indicating assignment requests for uplink and downlink radio resources may also be transmitted as necessary.

By the way, the acknowledgement information (ACK/NACK) can be essentially represented only by 1 bit, but, the acknowledgement information has the most basic function in retransmission control, and exerts large effects on system throughput. Therefore, it is desirable that the acknowledgement information (ACK/NACK) is fed back immediately after it occurs. In addition, as mentioned above, CQI indicates channel state of downlink, and is basic information in scheduling and adaptive modulation and channel coding and the like. Since the channel state may change every moment, it is also desirable that CQI is frequently fed back to the base station.

When a resource block is assigned for uplink data transmission, these pieces of control information can be reported to the base station apparatus immediately by using the resource block. However, there is a case in which it is necessary to report acknowledge information or CQI for the downlink data channel to the base station apparatus even though such resource block is not assigned.

In the system of the LTE scheme, the single-carrier scheme (SC-FDMA scheme) is adopted in the uplink, and the system is devised such that the acknowledgement information or CQI can be immediately reported to the base station apparatus in the above-mentioned case. On the other hand, from the viewpoint of further improving use efficiency of radio resources and improving data rate, the multicarrier scheme is preferable rather than the single-carrier scheme.

RELATED ART DOCUMENT

[Non-patent document 1] 3GPP R1-070103, Downlink L1/L2 Control Signaling Channel Structure: Coding, Jan. 15-19, 2007
[Non-Patent document 2] 3GPP 36.211 V8.2.0

SUMMARY OF THE INVENTION

Problem to be Solved by the Invention

An object of the present invention is to improve reception quality of control information in the uplink.

Means for Solving the Problem

For solving the problem, the present transmission apparatus is a transmission apparatus for transmitting an uplink control signal by using a predetermined number of basic frequency blocks, in a plurality of basic frequency blocks, wherein a system band is divided into a plurality of bands by a basic frequency block having a predetermined bandwidth, including:

a mapping unit configured to map control information to subcarriers in a basic frequency block in a given subframe;

an inverse Fourier transform unit configured to perform inverse Fourier transform on a signal to which the control information is mapped by the mapping unit; and a radio transmission unit configured to transmit a transmission signal, to a receiving apparatus by radio, including a signal on which inverse Fourier transform has been performed by the inverse Fourier transform unit, wherein, in a subframe subsequent to the given subframe, the mapping unit maps the control information to subcarriers in a basic frequency block of a band different from a band of the basic frequency block in the given subframe.

Another transmission apparatus is a transmission apparatus for transmitting an uplink control signal by using a predetermined number of basic frequency blocks in a plurality of basic frequency blocks, wherein a system band is divided into a plurality of bands by a basic frequency block having a predetermined bandwidth, including:

a mapping unit configured to map control information to subcarriers in a predetermined number of different basic frequency blocks in a given subframe;

an inverse Fourier transform unit configured to perform inverse Fourier transform on a signal to which the control information is mapped by the mapping unit; and a radio transmission unit configured to transmit a transmission signal, to a receiving apparatus by radio, including a signal on which inverse Fourier transform has been performed by the inverse Fourier transform unit, wherein, in a predetermined number of different basic frequency blocks, the mapping unit maps the control information to a plurality of bands that are prepared discontinuously in the frequency domain over a period of a subframe and that are prepared separately from a band for a shared data channel.

The present method is a method in a transmission apparatus for transmitting an uplink control signal by using a predetermined number of basic frequency blocks in a plurality of basic frequency blocks, wherein a system band is divided into a plurality of bands by a basic frequency block having a predetermined bandwidth, including:

a mapping step of mapping control information to subcarriers in a basic frequency block in a given subframe;

an inverse Fourier transform step of performing inverse Fourier transform on a signal to which the control information is mapped by the mapping step; and a radio transmission step of transmitting a transmission signal, to a receiving apparatus by radio, including a signal on which inverse Fourier transform has been performed by the inverse Fourier transform step, wherein, in the mapping step, in a subframe subsequent to the given subframe, the transmission apparatus maps the control information to subcarriers in a basic frequency block of a band different from a band of the basic frequency block in the given subframe.

Another method is a method in a transmission apparatus for transmitting an uplink control signal by using a predetermined number of basic frequency blocks in a plurality of basic frequency blocks, wherein a system band is divided into a plurality of bands by a basic frequency block having a predetermined bandwidth, including:

a mapping step of mapping control information to subcarriers in a predetermined number of different basic frequency blocks in a given subframe;

an inverse Fourier transform step of performing inverse Fourier transform on a signal to which the control information is mapped by the mapping step; and a radio transmission step of transmitting a transmission signal, to a receiving apparatus by radio, including a signal on which inverse Fourier transform has been performed by the inverse Fourier transform step, wherein, in the mapping step, in a predetermined number of different basic frequency blocks, the transmission apparatus maps the control information to a plurality of bands that are prepared discontinuously in the frequency domain over a period of a subframe and that are prepared separately from a band for a shared data channel.

The present receiving apparatus is a receiving apparatus for receiving an uplink control signal transmitted by using a predetermined number of basic frequency blocks in a plurality of basic frequency blocks, wherein a system band is divided into a plurality of bands by a basic frequency block having a predetermined bandwidth, including:

a Fourier transform unit configured to perform Fourier transform on a received signal;

a demapping unit configured to extract a signal mapped to each subcarrier based on the signal on which Fourier transform has been performed by the Fourier transform unit; and a restoring unit configured to restore control information extracted by the demapping unit, wherein, the demapping unit extracts control information mapped to subcarriers in a basic frequency block in a subframe, and in a subframe subsequent to a given subframe, the demapping unit extracts control information mapped to subcarriers in a basic frequency block of a band different from a band of the basic frequency block in the given subframe.

Another receiving apparatus is a receiving apparatus for receiving an uplink control signal transmitted by using a predetermined number of basic frequency blocks in a plurality of basic frequency blocks, wherein a system band is divided into a plurality of bands by a basic frequency block having a predetermined bandwidth, including:

a Fourier transform unit configured to perform Fourier transform on a received signal;

a demapping unit configured to extract a signal mapped to each subcarrier based on the signal on which Fourier transform has been performed by the Fourier transform unit; and a restoring unit configured to restore control information extracted by the demapping unit, wherein, in subcarriers in a predetermined number of different basic frequency blocks in a subframe, the demapping unit extracts control information mapped to a plurality of bands that are prepared discontinuously in the frequency domain over a period of a subframe and that are prepared separately from a band for a shared data channel.

The present method is a method in a receiving apparatus for receiving an uplink control signal transmitted by using a predetermined number of basic frequency blocks in a plurality of basic frequency blocks, wherein a system band is divided into a plurality of bands by a basic frequency block having a predetermined bandwidth, including:

a Fourier transform step of performing Fourier transform on a received signal;

a demapping step of extracting a signal mapped to each subcarrier based on the signal on which Fourier transform has been performed by the Fourier transform step; and a restoring step of restoring control information extracted by the demapping step, wherein, in the demapping step, the receiving apparatus extracts control information mapped to subcarriers in a basic frequency block in a subframe, and in a subframe subsequent to a given subframe, the receiving apparatus extracts control information mapped to subcarriers in a basic frequency block of a band different from a band of the basic frequency block in the given subframe.

Another method is a method in a receiving apparatus for receiving an uplink control signal transmitted by using a predetermined number of basic frequency blocks in a plurality of basic frequency blocks, wherein a system band is divided into a plurality of bands by a basic frequency block having a predetermined bandwidth, including:

a Fourier transform step of performing Fourier transform on a received signal;

a demapping step of extracting a signal mapped to each subcarrier based on the signal on which Fourier transform has been performed by the Fourier transform step; and a restoring step of restoring control information extracted by the demapping step, wherein, in the demapping step, in subcarriers in a predetermined number of different basic frequency blocks in a subframe, the receiving apparatus extracts control information mapped to a plurality of bands that are prepared discontinuously in the frequency domain over a period of a subframe and that are prepared separately from a band for a shared data channel.

The present mobile communication system is a mobile communication system including: a transmission apparatus for transmitting an uplink control signal by using a predetermined number of basic frequency blocks in a plurality of basic frequency blocks, wherein a system band is divided into a plurality of bands by a basic frequency block having a predetermined bandwidth; and a receiving apparatus for receiving the uplink signal, the transmission apparatus including:

a mapping unit configured, when mapping control information to subcarriers in a basic frequency block in a given subframe, to map, in a subframe subsequent to the given subframe, the control information to subcarriers in a basic frequency block of a band different from a band of the basic frequency block in the given subframe;

an inverse Fourier transform unit configured to perform inverse Fourier transform on a signal to which the control information is mapped by the mapping unit; and a radio transmission unit configured to transmit a transmission signal, to the receiving apparatus by radio, including a signal on which inverse Fourier transform has been performed by the inverse Fourier transform unit, the receiving apparatus including:

a Fourier transform unit configured to perform Fourier transform on a received signal;

a demapping unit configured, when extracting a signal mapped to each subcarrier based on the signal on which Fourier transform has been performed by the Fourier transform unit, to extract, in subcarriers in a basic frequency block in a given subframe, control information mapped to subcarriers in a basic frequency block of a band different from a band of the basic frequency block in the given subframe; and a restoring unit configured to restore control information extracted by the demapping unit.

Another mobile communication system is a mobile communication system including: a transmission apparatus for transmitting an uplink control signal by using a predetermined number of basic frequency blocks in a plurality of basic frequency blocks, wherein a system band is divided into a plurality of bands by a basic frequency block having a predetermined bandwidth; and a receiving apparatus for receiving the uplink signal, the transmission apparatus including:

a mapping unit configured, when mapping control information to subcarriers in a predetermined number of different basic frequency blocks in a given subframe, to map, in a predetermined number of different basic frequency blocks, the control information to a plurality of bands that are prepared discontinuously in the frequency domain over a period of a subframe and that are prepared separately from a band for a shared data channel;

an inverse Fourier transform unit configured to perform inverse Fourier transform on a signal to which the control information is mapped by the mapping unit; and a radio transmission unit configured to transmit a transmission signal, to the receiving apparatus by radio, including a signal on which inverse Fourier transform has been performed by the inverse Fourier transform unit, the receiving apparatus including:

a Fourier transform unit configured to perform Fourier transform on a received signal;

a demapping unit configured, when extracting a signal mapped to each subcarrier based on the signal on which Fourier transform has been performed by the Fourier transform unit, to extract, in subcarriers in a predetermined number of different basic frequency blocks in a subframe, control information mapped to a plurality of bands that are prepared discontinuously in the frequency domain over a period of a subframe and that are prepared separately from a band for a shared data channel; and a restoring unit configured to restore control information extracted by the demapping unit.

Effect of the Present Invention

According to an embodiment of the present invention, reception quality of control information in the uplink can be improved.

BRIEF DESCRIPTION OF THE DRAWINGS

FIG. 12 is an explanatory diagram showing an example of a transmission method of an uplink control channel according to an embodiment;

EMBODIMENTS FOR CARRYING OUT THE INVENTION

In the following, embodiments of the present invention are descried with reference to attached figures. While specific numerical value examples are used to facilitate understanding of the present invention, such numerical values are merely examples, so that any appropriate value may be used unless specified otherwise.

In the LTE-Advanced, it is the minimum requirements to satisfy requirements defined in IMT-Advanced, and the multi-access scheme needs to be studied by considering the following items mainly.

(1) Support of transmit and receive of wide-band signal transmission (2) Backward compatibility with Rel-8 LTE (3) Optimization of trade-off between improvement of characteristics and overhead of control signal (4) Support of various cell environments As to (1), in order to satisfy the requirement of peak data rate of equal to or more than 1 Gbps in the downlink especially, it is necessary to extend 20 MHz that is the maximum system bandwidth of the Rel-8 LTE specification to support about 100 MHz of frequency bandwidth in transmit and receive function. In addition, it is necessary to support scalable multi-bandwidths having high flexibility for frequency spectrum assignment.

As to (2), in the LTE-Advanced, it is minimum requirement to satisfy the requirements of IMT-Advanced. In addition, backward compatibility with Rel-8 LTE is essential in order to be able to introduce the system smoothly. That is, it is essential to provide a radio interface that can support connection of a user terminal (UE: User Equipment) of Rel-8 LTE within the frequency spectrum of LTE-Advanced.

As to (3), improvement factor of frequency diversity gain and frequency scheduling gain reduces (becomes saturated) as the frequency band becomes wider. On the other hand, overhead of a control signal necessary for feedback of channel quality information (CQI: Channel Quality Indicator) increases as the bandwidth increases. Therefore, it is necessary to set optimal transmit and receive bandwidth in consideration of trade-off relationship between improvement of characteristics and overhead of control signal.

As to (4), considering complementary introduction with the Rel-8 LTE, the LTE-Advanced emphasizes application to local area environments such as micro-cell, indoor/hot spot environment and the like. But, it is also necessary to realize support of outdoor macro-cell environment like Rel-8 LTE.

Figure 1:
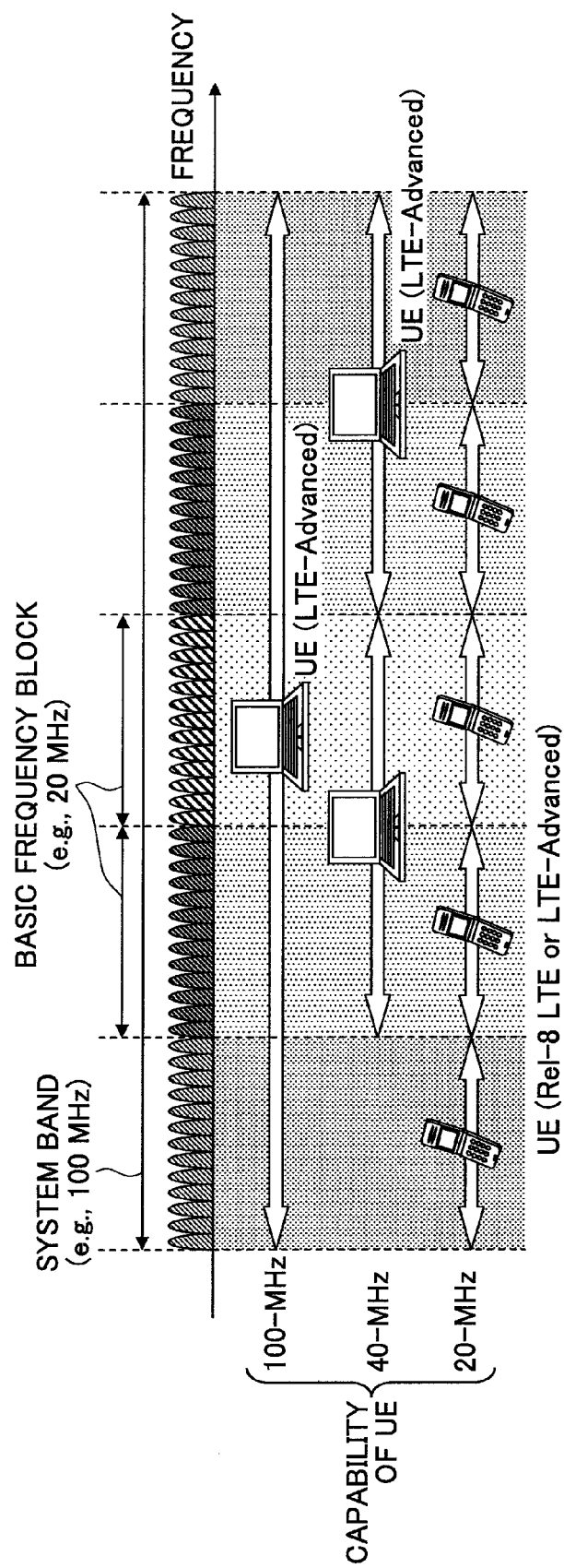
FIG. 1 is an explanatory diagram showing bands assigned to each user apparatus.

In order to satisfy the above-mentioned requirements, the layered channel bandwidth configuration is proposed as shown in FIG. 1. In FIG. 1, the lateral axis indicates frequency. In the layered channel bandwidth configuration, the system band is divided in units of basic frequency blocks. Then, the whole transmission band of the base station includes a plurality of basic frequency blocks. It is preferable that the bandwidth of the basic frequency block is about 15-20 MHz for supporting UE of Rel-8 LTE.

For a user apparatus (UE) of LTE-Advanced having capability of transmit and receive bandwidth wider than 20 MHz, a plurality of basic frequency blocks are flexibly assigned based on frequency diversity gain and the overhead of the control signal. More specifically, for a user apparatus (UE) of Rel-8 LTE having capability of transmit and receive bandwidth of 20 MHz, one basic frequency block is assigned. For a user apparatus (UE) of LTE-Advanced having capability of transmit and receive bandwidth of 40 MHz, two basic frequency blocks are assigned. For a user apparatus (UE) of LTE-Advanced having capability of transmit and receive bandwidth of 100 MHz, five basic frequency blocks are assigned. For a user apparatus (UE) of LTE-Advanced having capability of transmit and receive bandwidth greater than 20 MHz, basic frequency block(s) less than the capability of transmit and receive bandwidth may be assigned, for example, one base frequency block may be assigned.

Therefore, it is necessary to transmit and receive layer 1 (L1)/layer 2 (L2) control channels in units of basic frequency blocks such that the terminal of Rel-8 LTE can be connected.

In addition, in order to realize high peak throughput, it is essential that the terminal of LTE-Advanced transmits and receives signals over a plurality of basic frequency blocks in the same TTI (Transmission Time Interval) at the same time. Therefore, it is necessary to transmit L1/L2 control information corresponding to a shared data channel of a plurality of basic frequency blocks with high efficiency.

In the layered channel bandwidth configuration shown in FIG. 1, if a control channel is simply repeated in units of basic frequency blocks, overhead of the control signal increases. Thus, layered control channel configurations shown in FIGS. 2 and 3 are proposed as L1/L2 control channel configurations for realizing highly efficient transmission for LTE-Advanced having UE Capability of wider band while supporting control signal configuration of the terminal of Rel-8 LTE.

Figure 2:
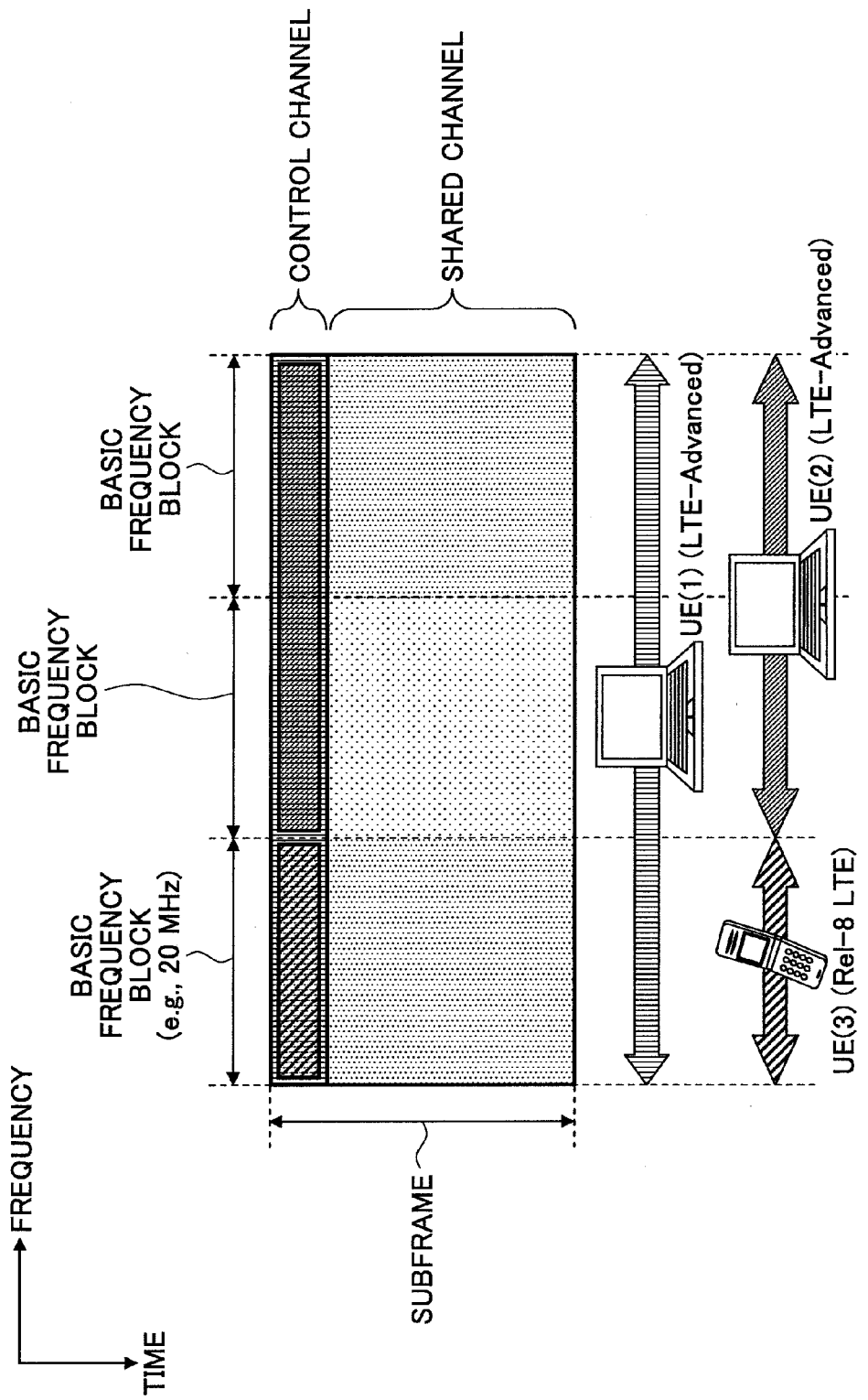
FIG. 2 is an explanatory diagram showing an example of a transmission method of a downlink control channel.

FIG. 2 shows the layered control channel configuration in the downlink. In FIG. 2, control channels of user apparatuses are shown by using corresponding hatching respectively. As shown in FIG. 2, for UE of LTE-Advanced having capability of transmit and receive bandwidth wider than 20 MHz, plurality of basic frequency blocks are flexibly assigned in consideration of frequency diversity gain and overhead of control signal. In each basic frequency block, several symbols from the head are assigned to the control channel. The several symbols may be 2-3 symbols for example. In addition, for UE of LTE-Advanced having capability of transmit and receive bandwidth wider than 20 MHz, one basic frequency block may be assigned. FIG. 2 shows a user apparatus UE(1) of LTE-Advanced to which three basic frequency blocks are assigned, a user apparatus UE(2) of LTE-Advanced to which two basic frequency blocks are assigned, and a user apparatus UE(3) of Rel-8 LTE to which one basic frequency blocks is assigned.

Figure 3:
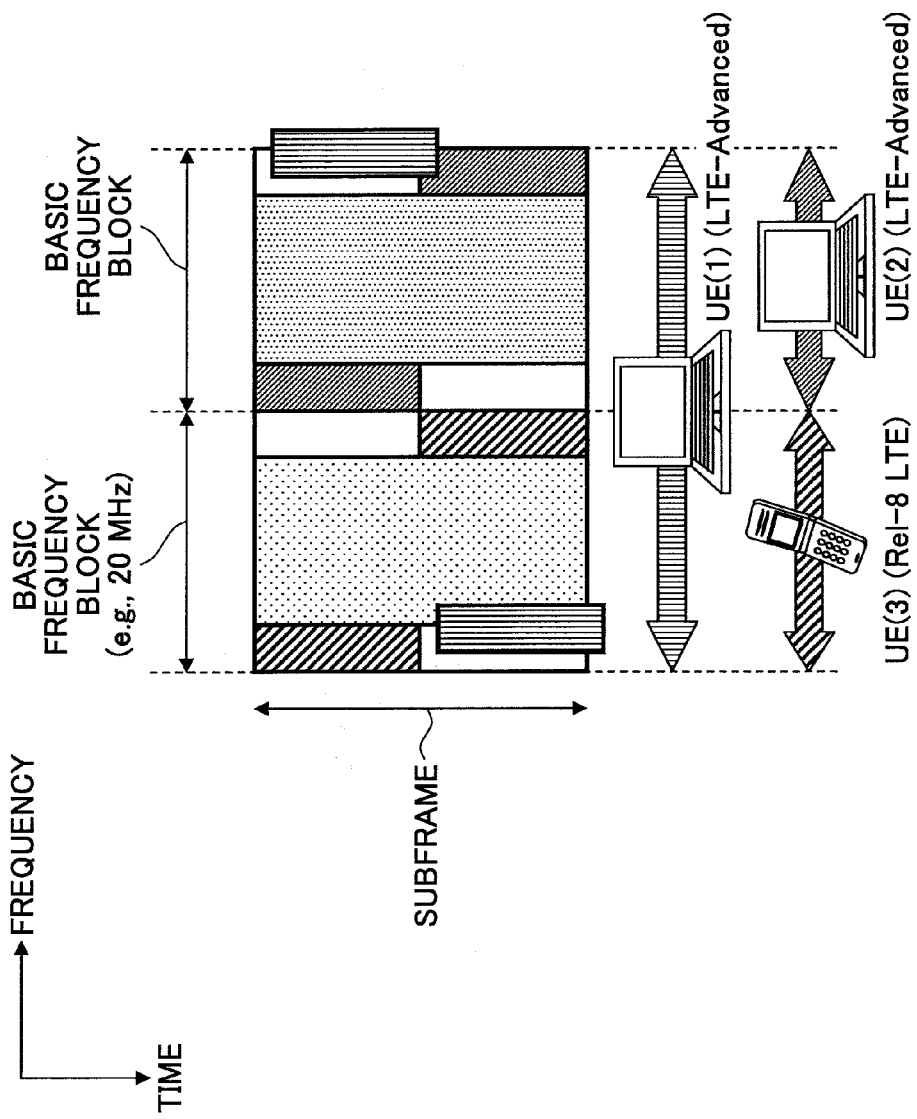
FIG. 3 is an explanatory diagram showing an example of a transmission method of an uplink control channel.

FIG. 3 shows the layered control channel configuration in the uplink. In FIG. 3, control channels of user apparatuses are shown by using corresponding hatching respectively. For example, a basic frequency block includes a plurality of resource blocks. Narrow bands are prepared in both ends of a band including one or more basic frequencies. These left and right two bands are reserved for transmission of control information. For the sake of convenience, these two bands are referred to as a first control band and a second control band respectively in order from the low frequency side. One resource block is about 180 kHz, for example. Also, one of the bands of the both ends is about 180 KHz similar to that for data transmission, for example. For example, a several number (10, for example) of subframes of 1 ms form one radio frame. Each subframe includes two slots. Numerical values such as frequency, period and the number are merely examples, and any appropriate numerical values may be used.

In the example shown in the figure, the user apparatus UE(1) of LTE-Advanced transmits the L1/L2 control channel to the base station apparatus continuously in two slots, in which the transmission is performed using the second control band in the first slot, and using the first control band in the next slot. Two basic frequency blocks are assigned to the user apparatus UE(1). By transmitting control information while performing large frequency hopping over the system bandwidth, large frequency diversity effect can be obtained, which is preferable from the viewpoint of enhancing reception quality of control information. The frequency hopping may be performed not only in units of slots but also in units of larger one (subframe, for example) or smaller one (symbol which forms the slot, for example). Also, since the first and the second bands are not used simultaneously, the present method can be also used in a system of a single-carrier scheme.

In addition, in the example shown in the figure, the L1/L2 control channel that is transmitted to the base station apparatus by the user apparatus UE(2) of LTE-Advanced and by the user apparatus UE(3) of Rel-8 LTE is transmitted using the second control band in the first slot, and is transmitted using the first control band in the next slot. The user apparatuses UE(2) and (3) are assigned one basic frequency block. The user apparatuses UE(2) and (3) transmit control information while performing frequency hopping over one basic frequency block.

The L1/L2 control channel may be transmitted by the first and the second control bands. However, in this method, both of the first and the second bands are used at the same time in the first slot. This transmission method becomes available when a multicarrier scheme is applied. In this case, the first slot may be used, and the subsequent slot may be used. But, it is preferable to use the first slot from the viewpoint that the transmission of the control channel can be completed early.

Also, the transmission method of the control information may be changed depending on whether a resource block is assigned for transmission of a data channel or not. When the resource block is not assigned for transmitting a data channel, the L1/L2 control channel to be transmitted by the user apparatus to the base station apparatus is transmitted while performing frequency hopping between the first and the second control bands. However, when the resource block is assigned for the transmission of the data channel, the control information is transmitted using the resource block. In this case, the control information and the data channel are multiplexed using the time division multiplexing scheme.

Also, the L1/L2 control channel to be transmitted to the base station apparatus by the user apparatus may be transmitted using both of the first and the second bands at the same time. In this case, the transmission may be performed using the whole subframe instead of using one slot (such that two slots are used). This method is advantageous when the number of bits of control information per one user is large and when radio propagation status is bad, and the like. The reason that the method is advantageous when the radio propagation state is bad is that, for keeping required quality for information of the number of bits, the data size can be small if the channel state is good, but a large data size is required if the channel state is bad.

In addition, when the same user can use the first control band and the second control band in a subframe, the channel quality information (CQI) may be transmuted in one control band, and acknowledgement information (ACK/NACK) may be transmitted in another control band, in the first slot. In the subsequent slot, CQI may be transmitted by the other control band and ACK/NACK may be transmitted in the control band. Since ACK/NACK and CQI are transmitted separately, it is not necessary to prepare a transmission format for multiplexing and transmitting them, which is preferable from the viewpoint of improving detection accuracy of ACK/NACK, reducing load for blind detection, and the like, for example. Also, acknowledgement information (ACK/NACK) may be transmitted using the first and the second control bands at the same time in the first slot. Then, channel quality information (CQI) may be transmitted using the first and the second control bands at the same time in the subsequent slot. The transmission order of ACK/NACK and CQI may be reversed. Also in this method, it becomes unnecessary to prepare the transmission format for multiplexing and transmitting ACK/NACK and CQI.

In the present embodiment, frequency hopping is applied to the L1/L2 control channel in the uplink of LTE-Advanced.

Figure 4:
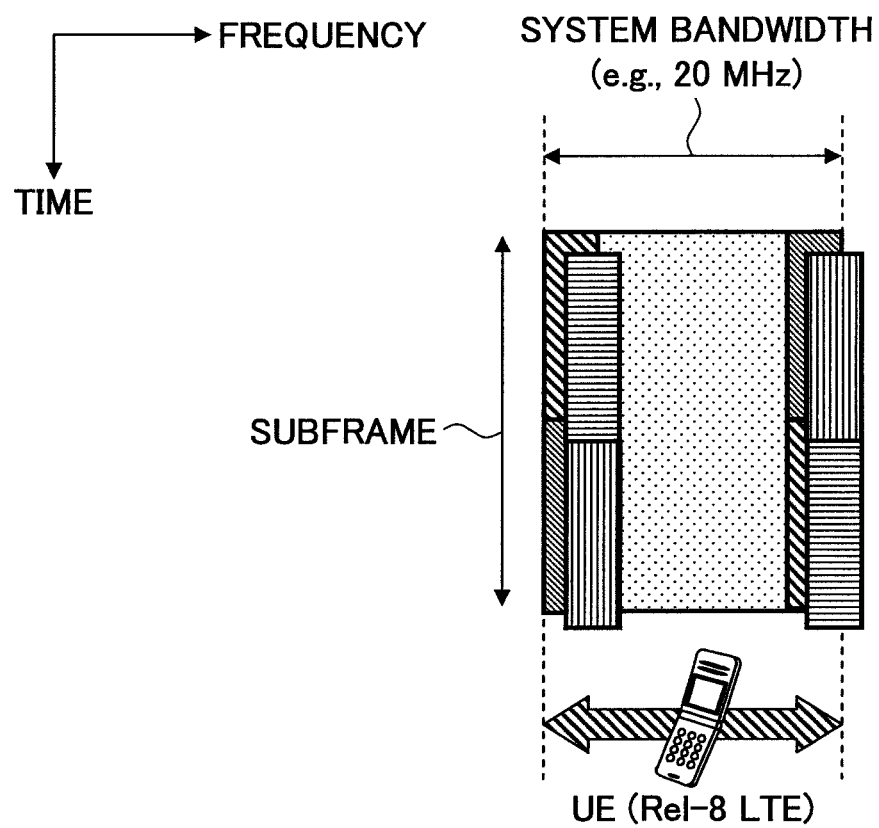
FIG. 4 is an explanatory diagram showing an example of a transmission method of an uplink control channel.

In the uplink of Rel-8 LTE, a SC-FDMA (Single-Carrier Frequency Division Multiple Access) scheme that can keep peak-to-average power ratio (PAPR) low and that is advantageous for increasing coverage is adopted. In addition, a configuration shown in FIG. 4 is adopted for the physical uplink control channel for transmitting CQI and ACK/NACK information. In FIG. 4, control information for user apparatuses are shown by corresponding different hatching respectively.

More specifically, in order to realize low PAPR and low overhead, single-carrier transmission of narrow bandwidth (180 kHz) is used. In addition, for realizing frequency diversity effect, frequency hopping is performed by using bands of both ends of the transmission spectrum between two slots in 1 msec subframe (TTI). The frequency hopping may be called intra-TTI hopping. Further, PUCCHs from a plurality of UEs may be multiplexed by CDMA in the same radio resource.

In the uplink of LTE-Advanced, it is necessary to transmit control information of a plurality of basic frequency blocks. In addition, considering application of MIMO multiplexing transmission (Single User-MIMO) for further increasing peak data rate, it is effective, especially for local area environment, to apply OFDM (Orthogonal Frequency Division Multiplexing) having high affinity with the highly accurate signal separation technology such as maximum likelihood detection (MLD). In this point, LTE-Advanced is different from Rel-8 LTE in which increase of coverage due to decrease of PAPR is emphasized.

Therefore, as the uplink radio access scheme of the LTE-Advanced, it is considered to apply OFDM, Clustered DFT-Spread OFDM in which Localized transmission is performed by dividing a block to a plurality of blocks after DFT in order to provide flexibility of assignment in single-carrier transmission, and multicarrier transmission such as Multicarrier DFT-Spread OFDM using a plurality of DFTs.

Thus, the present embodiment describes: (1) a frequency hopping method when transmitting control information of a plurality of basic frequency blocks; and (2) a transmission method for a transmission method of control information considering application of multicarrier transmission in addition to single-carrier transmission. In the present embodiment, as an example, an uplink L1/L2 control channel of LTE-Advanced is described.

Figure 5:
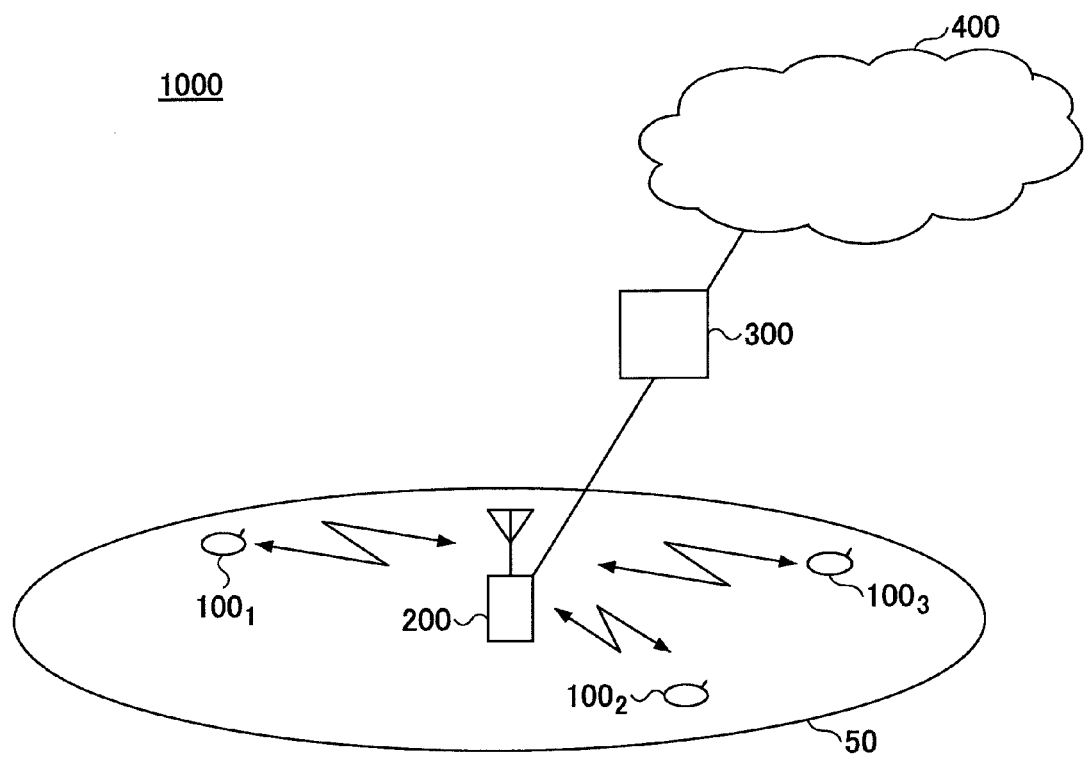
FIG. 5 is an explanatory diagram showing a mobile communication system according to an embodiment.

In the following, the mobile communication system including the user apparatus and the base station apparatus of the present embodiment is described with reference to FIG. 5.

The radio communication system 1000 is a system including, for example, Evolved UTRA and UTRAN (also called Long Term Evolution or Super 3G). The radio communication system may be also called as IMT-Advanced or 4G.

The radio communication system 1000 includes a base station apparatus (eNB: eNode B) 200 and user apparatuses (UE: User Equipment) 100 (100₁, 100₂, 100₃, . . . , 100ₙ; where n is an integer greater than 0) that communicates with the base station apparatus 200. The names of eNB and UE may be changed according to discussions for the communication schemes of the next-generation mobile communication systems. In such a case, these may be called as the changed names. The base station apparatus 200 is connected to an upper station 300, and the upper station 300 is connected to a core network 400. For example, the upper station 300 may include an access gateway apparatus 300, a radio network controller (RNC), a mobility management entity (MME) and the like. Also, the upper station may be changed as necessary according to discussions of the communication schemes of the next generation mobile communication system. In such a case, the base station apparatus 200 is connected to the upper station.

Since each user apparatus 100 (100₁, 100₂, 100₃ . . . 100ₙ) has the same configuration, function and state, the user apparatus 100ₙ is used in the descriptions below unless otherwise mentioned.

The radio communication system 1000, in Evolved UTRA, for example, employs orthogonal frequency division multiple access (OFDMA) in the downlink, and employs single-carrier frequency division multiple access (SC-FDMA) in the uplink. As mentioned above, OFDMA is a multicarrier communication scheme in which a frequency band is divided into narrow frequency bands (subcarriers) and data is mapped to each subcarrier for performing communication. SC-FDMA is a single-carrier transmission scheme in which a frequency band is divided for each user apparatus, and a plurality of user apparatuses use frequency bands different with each other in order to reduce interference between the user apparatuses. By configuring the system as mentioned above, the present mobile communication system can realize full-support of E-UTRA. In addition, in the uplink, the multicarrier scheme may be used. More specifically, when the multicarrier scheme is applied in the uplink and the downlink, an Orthogonal Frequency Division Multiplexing (OFDM) scheme may be used.

In the following, communication channels used in Evolved UTRA and UTRAN are described. These communication channels may be applied to the mobile communication system of the present embodiment.

For downlink, a physical downlink shared channel (PD-SCH) shared by the user apparatuses 100, and a physical downlink control channel (PDCCH) are used. The physical downlink control channel is also called as a downlink L1/L2 control channel. User data, that is, a normal data signal is transmitted by the physical downlink shared channel.

For uplink, a physical uplink shared channel (PUSCH) shared by the user apparatuses 100, and a physical uplink control channel (PUCCH) are used. User data, that is, a normal data signal is transmitted by the physical uplink shared channel. Also, the physical uplink control channel is used to transmit downlink quality information (channel quality indicator: CQI) used for scheduling and adaptive modulation and coding (AMC) of the physical downlink shared channel and to transmit acknowledgement information for the physical downlink shared channel. The acknowledgement information is represented by any one of Acknowledgement (ACK) indicating that a transmission signal is properly received and Negative Acknowledgement (NACK) indicating that the signal is not properly received.

The physical uplink control channel may also be used to transmit, in addition to the CQI and the acknowledgement information, a scheduling request for requesting assignment of resources of an uplink shared channel and a release request used in persistent scheduling. Here, assignment of resources of an uplink shared channel indicates a process where the base station apparatus 200 reports to the user apparatus 100ₙ by using the physical downlink control channel in a given subframe that the user apparatus is allowed to communicate using the uplink shared channel in a subsequent subframe.

For the sake of explanation, a case is described where the user apparatus 100ₙ transmits control information to the base station apparatus. The control information includes uplink L1/L2 control information, acknowledgement information (ACK/NACK) for a data channel transmitted in the downlink and/or channel quality information (CQI) indicating channel state of the downlink. But, any information may be included in the control information to be transmitted.

Figure 6:
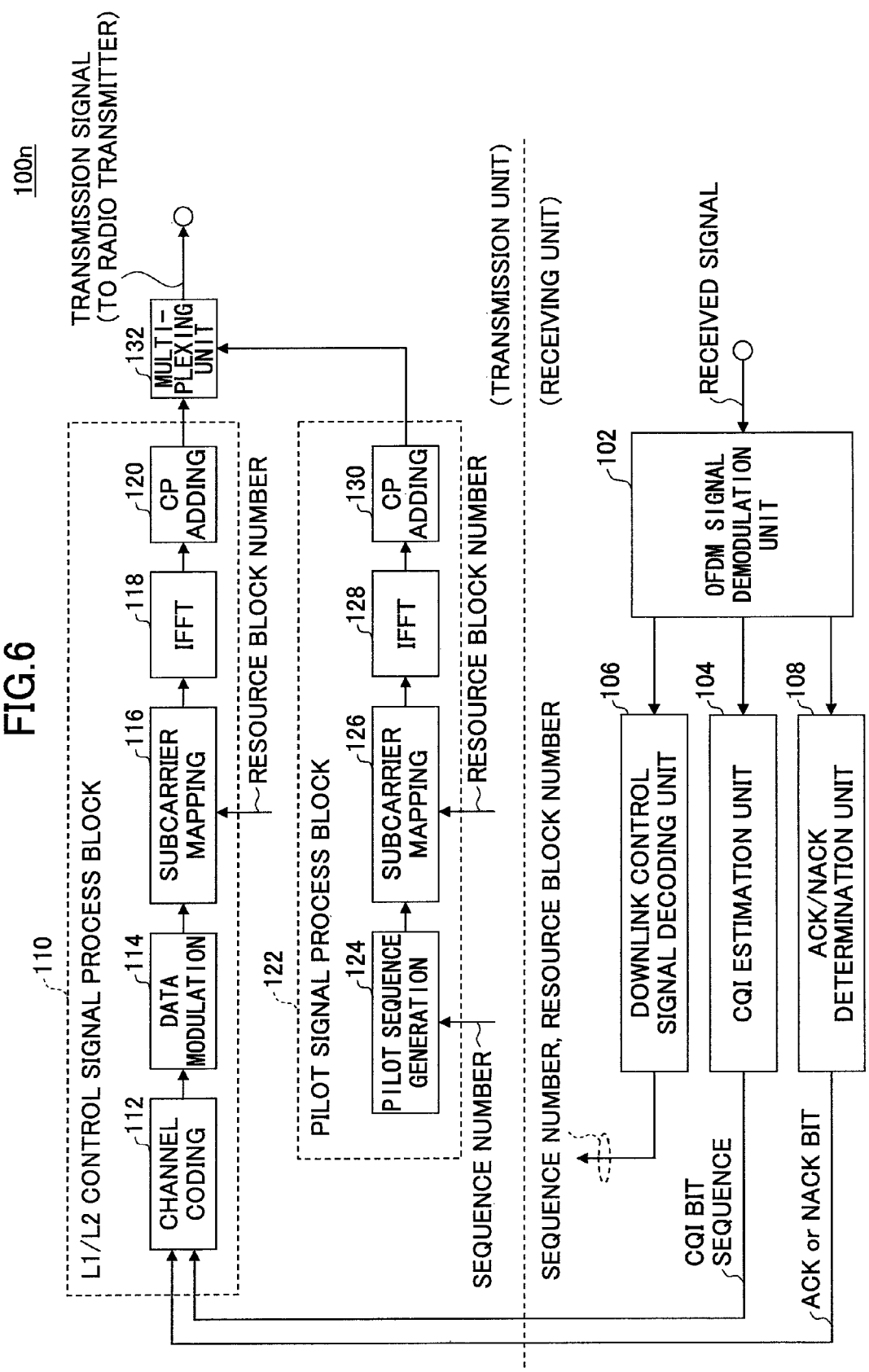
FIG. 6 is a partial block diagram showing a user apparatus according to an embodiment.

The user apparatus 100ₙ of the present embodiment is described with reference to FIG. 6.

The user apparatus 100ₙ of the present embodiment includes a transmission apparatus. The transmission apparatus includes an OFDM signal demodulation unit 102, a CQI estimation unit 104, a downlink control signal decoding unit 106, an ACK/NACK determination unit 108, an L1/L2 control signal process block 110, a channel coding unit 112, a data modulation unit 114, a subcarrier mapping unit 116, an inverse fast Fourier transform unit (IFFT) 118, a guard interval adding unit (CP) 120, a a pilot signal process block 122, a pilot sequence generation unit 124, a subcarrier mapping unit 126, an inverse fast Fourier transform unit (IFFT) 128, a guard interval adding unit 130, and a multiplexing unit 132.

The OFDM signal demodulation unit 102 demodulates a received signal modulated by the OFDM scheme to extract a baseband signal. For example, the OFDM signal demodulation unit 102 performs, on the received signal, processing such as removal of guard interval, Fourier transform, subcarrier demapping and data demodulation so as to prepare a downlink pilot channel, a downlink control channel (and/or broadcast channel) and a downlink data channel and the like.

The CQI estimation unit 104 derives channel quality information (CQI) indicating a channel state of the downlink based on reception quality of the downlink pilot channel. The reception quality of the downlink pilot channel may be represented by any proper amount such as received power, SIR(Signal-to-Interference power Ratio), SINR (Signal-to-Interference plus Noise power Ratio) and Eb/N₀ (signal power to noise power density ratio per 1 bit information). The CQI can be derived by properly quantizing the reception quality that is classified to multiple levels. For example, the reception quality may be represented by 32 bits, and CQI may be represented by 5 bits. The pilot channel is a signal including a pattern known to the transmission side and the receiving side, and the pilot channel may be referred to as a reference signal, a training signal and the like.

The downlink control signal decoding unit 106 decodes a downlink control channel to extract a downlink control signal. The downlink control channel may be a downlink L1/L2 control channel or may be a broadcast channel (BCH). In the present embodiment, especially, the downlink control signal may include a code sequence number of a pilot channel to be used for communication, and scheduling information (resource block number, transmission format, user identification information etc.) for downlink and/or uplink.

The ACK/NACK determination unit 108 determines whether the downlink data channel is properly received by performing error detection, for example. The error detection may be performed by the cyclic redundancy check (CRC) method, for example.

The L1/L2 control signal process block 110 prepares a L1/L2 control channel transmitted by the uplink.

The channel coding unit 112 performs channel-coding on control information transmitted in the uplink using a predetermined coding rate. The control information includes control information such as the L1/L2 control channel, for example. In the present embodiment, the control information includes at least one of acknowledgement information (ACK/NACK) for the downlink data channel and CQI indicating downlink channel state.

The data modulation unit 114 performs data modulation on the control information using a phase-shift keying scheme (such as BPSK, QPSK, 8PSK) or a quadrature amplitude modulation (QAM) scheme.

The subcarrier mapping unit 116 maps control information to subcarriers. The subcarriers are limited to subcarriers within a band that can be used by the user apparatus in the system band. More specifically, the control information may be mapped to the first and the second control bands shown in FIGS. 3 and 4, or may be mapped to a resource block the same as that of the uplink data channel. Details of mapping are described later.

The inverse fast Fourier transform unit (IFFT) 118 performs inverse fast Fourier transform on a signal including the control information mapped to each subcarrier so as to convert the signal in the frequency domain to a signal in the time domain.

The guard interval adding unit (CP) 120 adds a guard interval to a signal after IFFT. The guard interval may be prepared by the Cyclic Prefix (CP) scheme, for example.

The pilot signal process block 122 prepares a pilot channel to be transmitted in the uplink.

The pilot sequence generation unit 124 generates a code sequence indicating a pilot channel based on a code sequence number of the pilot channel used for communication. The code sequence may be any proper code sequence suitable for the pilot channel. As an example, the pilot channel may be a CAZAC code sequence.

The subcarrier mapping unit 126 maps the pilot channel to proper subcarriers.

The inverse fast Fourier transform unit (IFFT) 128 performs inverse fast Fourier transform on a signal including the pilot channel mapped to each subcarrier so as to convert the signal in the frequency domain to a signal in the time domain.

The guard interval adding unit (CP) 130 adds a guard interval to a signal after IFFT.

The multiplexing unit 132 multiplexes the L1/L2 control channel and the pilot channel. The multiplexing may be realized by simply adding the channels. Also, a multiplexing method such as time division multiplexing may be used. The transmission signal including the multiplexed signal is supplied to a radio transmission unit (not shown in the figure), and transmitted by radio in the uplink finally.

<Base Station Apparatus>

Figure 7:
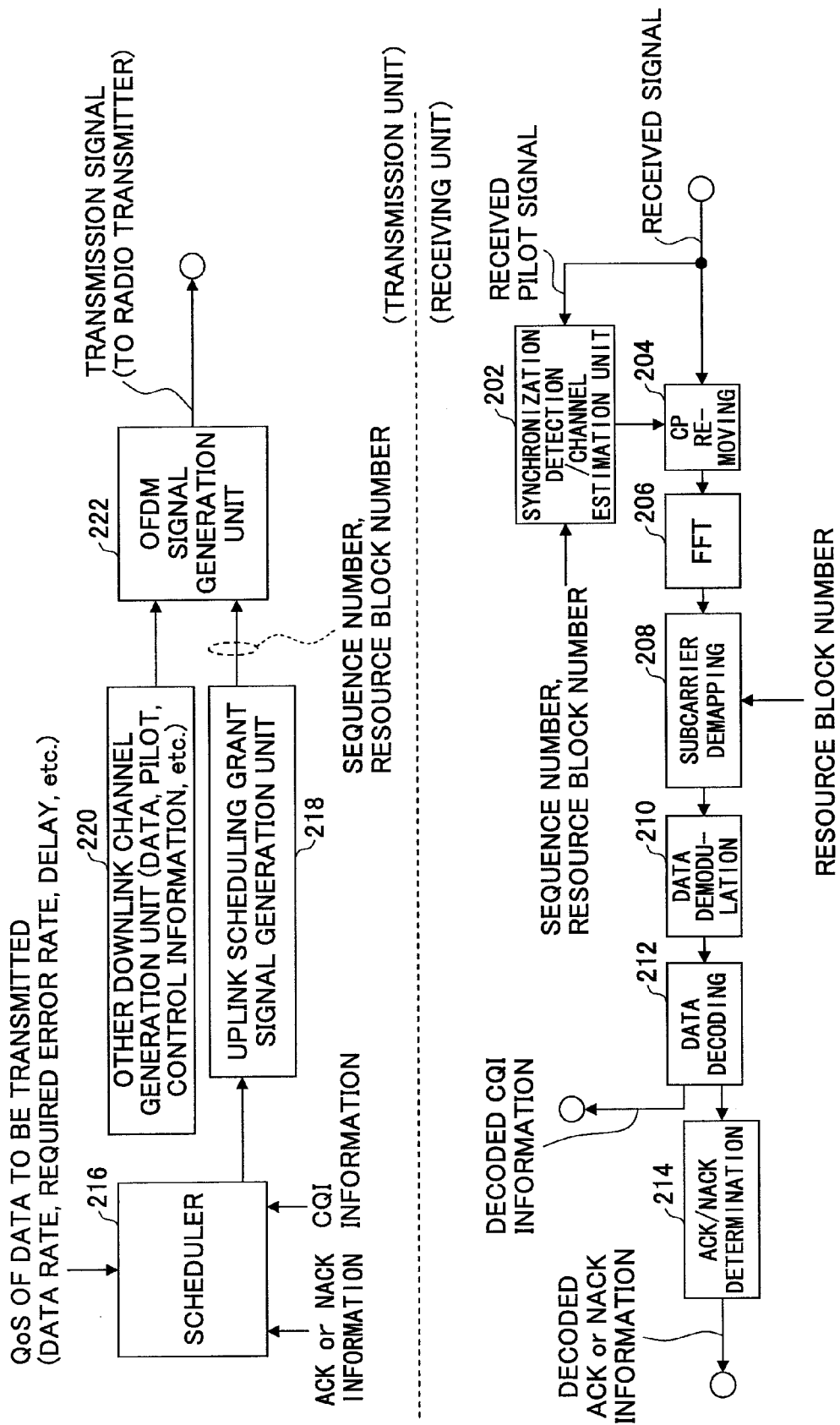
FIG. 7 is a partial block diagram showing a base station according to an embodiment.

The base station apparatus 200 of the present embodiment is described with reference to FIG. 7.

The base station apparatus 200 of the present embodiment includes a receiving apparatus. The receiving apparatus includes a synchronization detection and channel estimation unit 202, a guard interval removing unit 204, a fast Fourier transform unit (FFT) 206, a subcarrier demapping unit 208, a data demodulation unit 210, a data decoding unit 212, an ACK/NACK determination unit 214, a scheduler 216, an uplink scheduling grant signal generation unit 218, an other downlink channel generation unit 220, and an OFDM signal generation unit 222.

The synchronization detection and channel estimation unit 202 performs synchronization establishment and channel estimation based on the pilot channel received in the uplink.

The guard interval removing unit 204 removes the guard interval from the received signal according to synchronization timing of the received signal.

The fast Fourier transform unit (FFT) 206 performs fast Fourier transform on the received signal so as to convert the signal in the time domain to a signal in the frequency domain.

The subcarrier demapping unit 208 extracts a signal mapped to each subcarrier. The signal may include only a control channel, or may include both of the control channel and the data channel.

The data demodulation unit 210 demodulates the received signal.

The data decoding unit 212 decodes the data-demodulated signal.

Although the data demodulation and the data decoding are performed for the control channel and the data channel separately, they are shown collectively for the sake of simplicity for drawing.

The ACK/NACK determination unit 214 determines whether the received uplink data channel is properly received by performing error detection, for example. The error detection may be performed by the cyclic redundancy check (CRC) method, for example.

The scheduler 216 plans assignment of radio resources (performs scheduling). The scheduling may be performed based on radio propagation status, required quality (QoS), necessity of retransmission, and the like. The scheduling may be performed by any proper algorithm such as MAX-C/I method and proportional fairness method. The radio propagation status may be estimated by using CQI reported from the user apparatus for the downlink, and may be estimated by using receive SINR and the like for the uplink. The required QoS may be determined in terms of data rate, error rate, permissible delay time and the like. Necessity of retransmission may be determined based on acknowledgement information (ACK/NACK).

The uplink scheduling grant signal generation unit 218 prepares control information representing scheduling information (uplink grant) permitting transmission of a data channel in the uplink. The scheduling information includes a resource block permitted to use, transmission format and the like.

The other downlink channel generation unit 220 prepares a downlink signal other than the scheduling information (data channel, broadcast channel, synchronization channel, pilot channel and other control channel and the like).

The OFDM signal generation unit 222 modulates the signal including various downlink information using the OFDM scheme to prepare a downlink transmission signal. For example, the OFDM signal generation unit 222 performs processing such as channel coding, data modulation, subcarrier mapping, IFFT and adding of the guard interval. The downlink transmission signal is transmitted to a radio transmitter (not shown in the figure), and is transmitted by radio in the downlink finally.

In the following, transmission methods of control information according to an embodiment are described. Although several transmission methods are descried, these are merely examples, and the examples do not cover everything. As mentioned above, in the communication system of the present embodiment, the uplink control channel is transmitted and received in units of the basic frequency blocks.

In the following, as an example, a case is shown in which two basic frequency blocks are used by one user apparatus.

Also, equal to or more than three basic frequency blocks may be used by one user apparatus. The user apparatus $100_n$ performs transmission of control information of a plurality of basic frequency blocks.

(Method 1) Intra-TTI hopping is applied within a basic frequency block and inter-TTI hopping is applied between basic frequency blocks by using single-carrier transmission.

Figure 8:
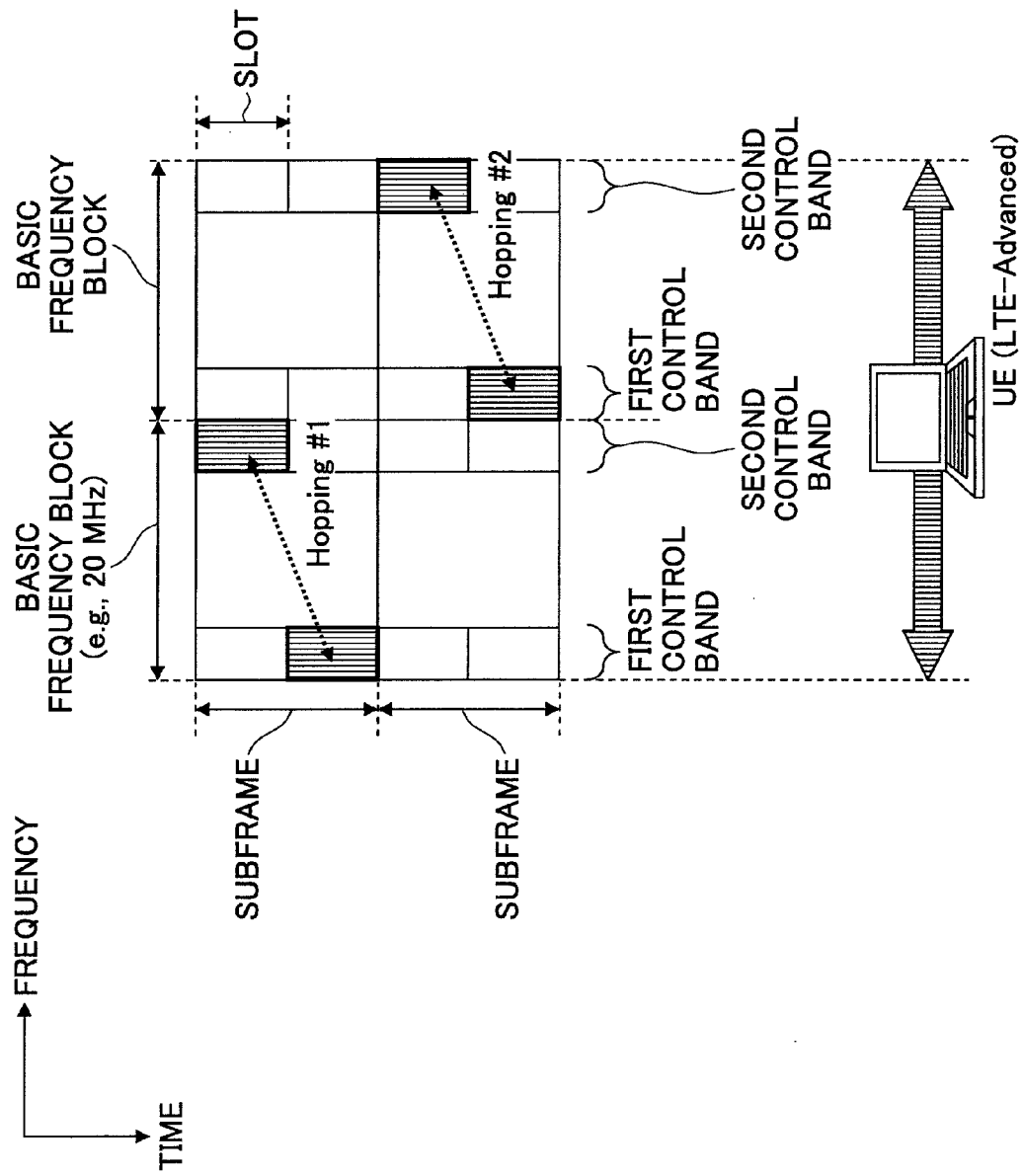
FIG. 8 is an explanatory diagram showing an example of a transmission method of an uplink control channel according to an embodiment.

In this method, as shown in FIG. 8, in transmission of the L1/L2 control channel transmitted to the base station apparatus 200 by the user apparatus $100_n$, in continuous subframes, the band of basic frequency block in which the L1/L2 control channel is transmitted in a first subframe is different from the band of basic frequency block in which the L1/L2 control channel is transmitted in the subsequent subframe. In each basic frequency block, transmission of the L1/L2 control channel is performed continuously in the two slots, in which the channel is transmitted by the second control band in the first slot, and the channel is transmitted by the first control band in the next slot. The order can be reversed.

(Method 2) Intra-TTI hopping is applied between basic frequency blocks by using single carrier transmission.

Figure 9:
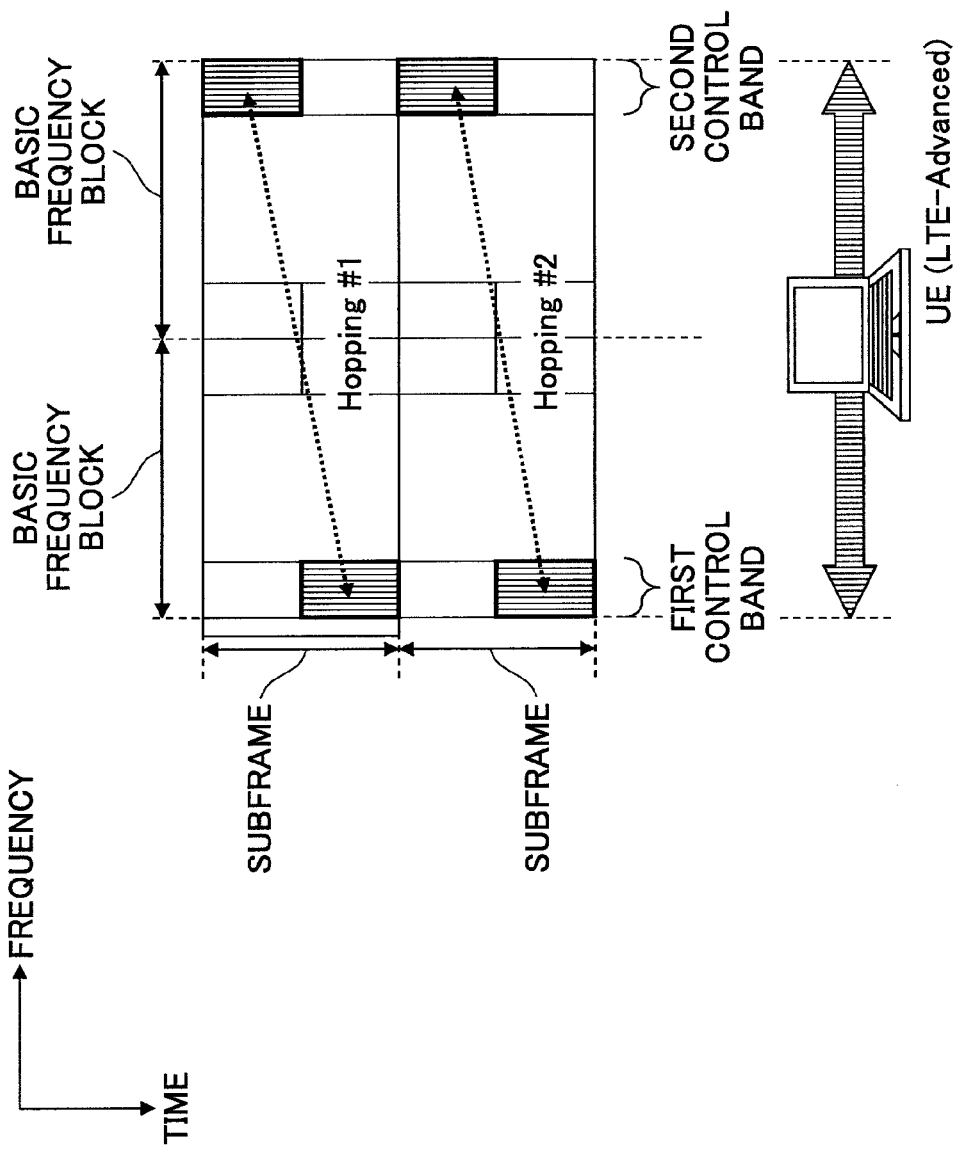
FIG. 9 is an explanatory diagram showing an example of a transmission method of an uplink control channel according to an embodiment.

In this method, as shown in FIG. 9, transmission of the L1/L2 control channel to be transmitted to the base station apparatus 200 by the user apparatus $100_n$ is performed by using a plurality of different basic frequency blocks in a subframe. In the present embodiment, a case is described in which two basic frequency blocks are used. Similar processing is applied in cases in which equal to or more than three basic frequency blocks are used. In the two basic frequency blocks, the first control band and the second control band located in (including) bands of ends of the two basic frequency blocks are prepared. In the two basic frequency blocks, transmission of L1/L2 control channel is performed continuously in two slots. In the first slot, the channel is transmitted using the second control band of a basic frequency block of the high frequency side in the two basic frequency blocks, and in the next slot, the channel is transmitted using the first control band of a basic frequency block of the low frequency side. The order may be reversed.

(Method 3) The channel is transmitted from a plurality of basic frequency blocks by using multicarrier transmission.

Figure 10:
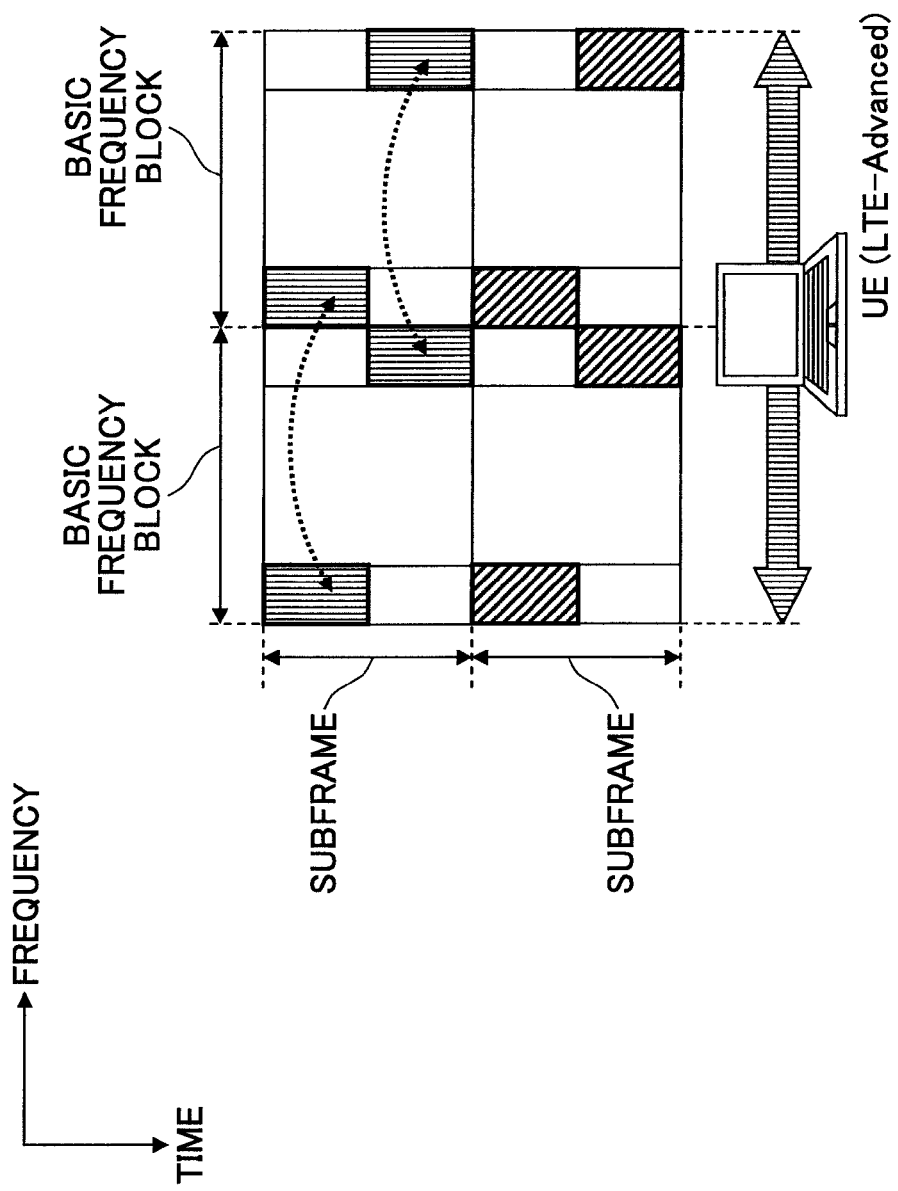
FIG. 10 is an explanatory diagram showing an example of a transmission method of an uplink control channel according to an embodiment.

In this method, as shown in FIG. 10, transmission of the L1/L2 control channel to be transmitted to the base station apparatus 200 by the user apparatus $100_n$ is performed by using a plurality of different basic frequency blocks in a subframe. In the present embodiment, a case is described in which two basic frequency blocks are used as an example. Similar processing is applied in a case in which equal to or more than three basic frequency blocks are used. In each of the two basic frequency blocks, the first control band and the second control band located in (including) bands of ends of the basic frequency block are prepared. In each of the two basic frequency blocks, the L1/L2 control channel is transmitted at the same time (in the same slot) where multicarrier transmission is applied. In the first slot, the channel is transmitted using the first control band of a basic frequency block in the high frequency side and the first control band of a basic frequency block in the low frequency side, and in the next slot, the channel is transmitted using the second control band of the basic frequency block in the low frequency side and the second control band of the basic frequency block in the high frequency side. The order may be reversed. In the example shown in FIG. 10, control bands to which the L1/L2 control channel is mapped are the same in the continuous subframes.

Figure 11:
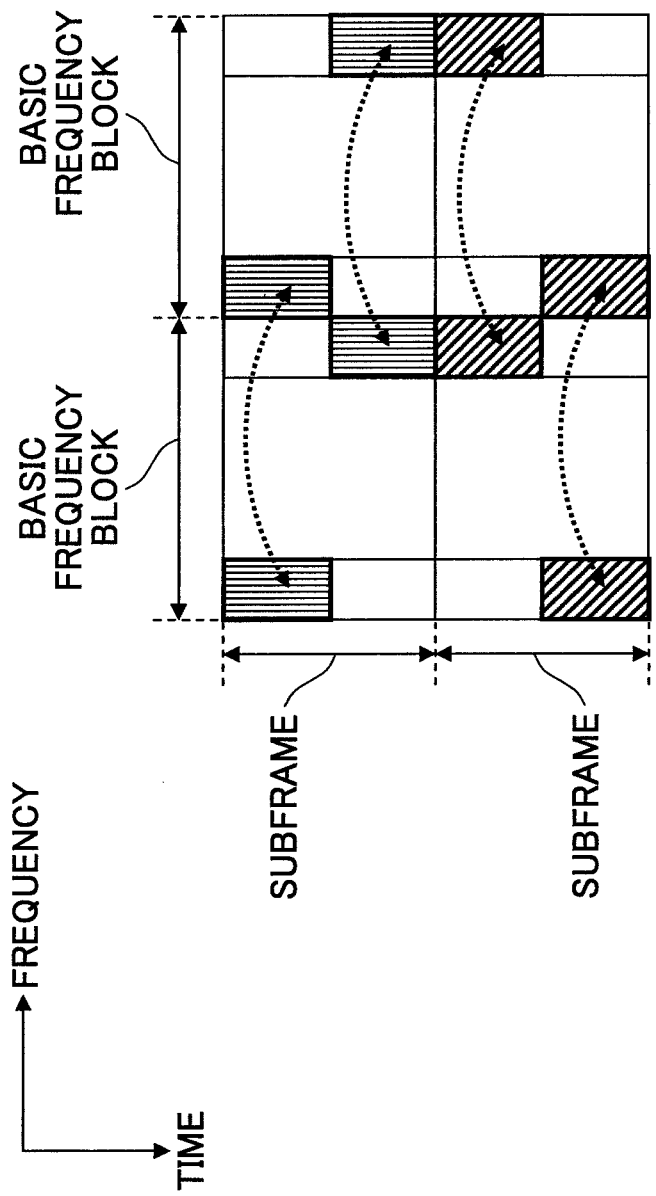
FIG. 11 is an explanatory diagram showing an example of a transmission method of an uplink control channel according to an embodiment.

In addition, as shown in FIG. 11, control bands to which the L1/L2 control channel is mapped may be different in the continuous subframes.

Characteristics of the transmission methods of the control information described as the above-mentioned methods 1-3 are described with reference to FIG. 12.

Characteristics regarding frequency diversity are described.

In the first method, since intra-TTI hopping is performed in a basic frequency block in a subframe, the method 1 is similar to Rel-8 LTE in terms of effect of frequency diversity.

In the method 2, intra-TTI hopping is performed between a plurality of basic frequency blocks in a subframe. Since bands where the L1/L2 control channel are separated, the method 2 is better than the method 1 in terms of the effect of frequency diversity.

In the method 3, since multicarrier transmission is applied, and the L1/L2 control channel is transmitted by a plurality of bands in a slot, the method 3 is better than the methods 1 and 2 in terms of the effect of frequency diversity.

In the following, characteristics regarding other cell interference are described.

Interference occurs when a cell where the user apparatus resides and other cell different from the cell use radio resources of the same band.

In the method 1, hopping patterns are configured to be different for each cell such that radio resources different from other cell are used. For example, bands of the basic frequency blocks are configured to be different for each subframe. By configuring the bands of the basic frequency blocks to be different for each subframe, even when a radio resource of the same band is used at an instant, a different radio resource can be used at another instant different from the instant.

The method 2 is similar to Rel-8 LTE in that the L1/L2 control channel is transmitted by similar band in each subframe.

The method 3 is similar to Rel-8 LTE in that the L1/L2 control channel is transmitted by similar band in each subframe. However, as shown in FIG. 11, interference from other cell can be reduced by configuring the system such that the L1/L2 control channel is transmitted by using different bands in each subframe.

In the following, characteristics regarding PAPR are described.

The methods 1 and 2 are similar to Rel-8 LTE in that they use single-carrier transmission.

As to the method 3, since it uses multicarrier transmission, PAPR becomes larger compared to method 1 and method 2.

In the following, characteristics regarding multiplexing with the terminal of Rel-8 LTE in the same resource are described.

Configuration in 1 subframe in the method 1 is similar to Rel-8 LTE. Therefore, it is possible to multiplexing with the terminal of Rel-8 LTE within the same resource.

In the method 2, the L1/L2 control channel is mapped to bands of both ends of the basic frequency block in the terminal of Rel-8 LTE. As to the terminal of LTE-Advanced, the L1/L2 control channel is mapped to bands of both ends of two basic frequency blocks. Therefore, as the number of terminals of LTE-Advanced becomes greater, the frequency use efficiency of bands of the both ends of the two basic frequency blocks improves, but, the frequency use efficiency of bands between the two basic frequency blocks becomes lower.

The method 3 is different from Rel-8 LTE in the transmission method since multicarrier transmission is applied in the method 3. When multicarrier DFT-Spread OFDM is applied, code division multiplexing can be performed with the terminal of Rel-8 LTE. However, when OFDM or Clustered DFT-Spread OFDM is applied, it is necessary to perform frequency division multiplexing or time division multiplexing since code division multiplexing is not available.

In the following, characteristics regarding information amount that can be transmitted per TTI, and time required for transmitting control information over a plurality of basic frequency blocks are described.

In the methods 1 and 2, the information amount that can be transmitted per TTI is the same as that of Rel-8 LTE. Therefore, a plurality of TTIs are necessary for transmitting control information over a plurality of basic frequency blocks. Also, TTI may be decreased by encoding control information of the basic frequency block in units of slots.

Since the method 3 is multicarrier transmission, transmission amount that can be transmitted per TTI is greater than that of Rel-8 LTE. Therefore, compared to the methods 1 and 2, control information can be transmitted in shorter time. But, by the amount, the radio resource used per TTI becomes larger compared to the methods 1 and 2.

As shown in FIG. 12, when transmitting control signal using one basic frequency block, the methods 1 and 2 becomes similar to Rel-8 LTE.

Figure 13:
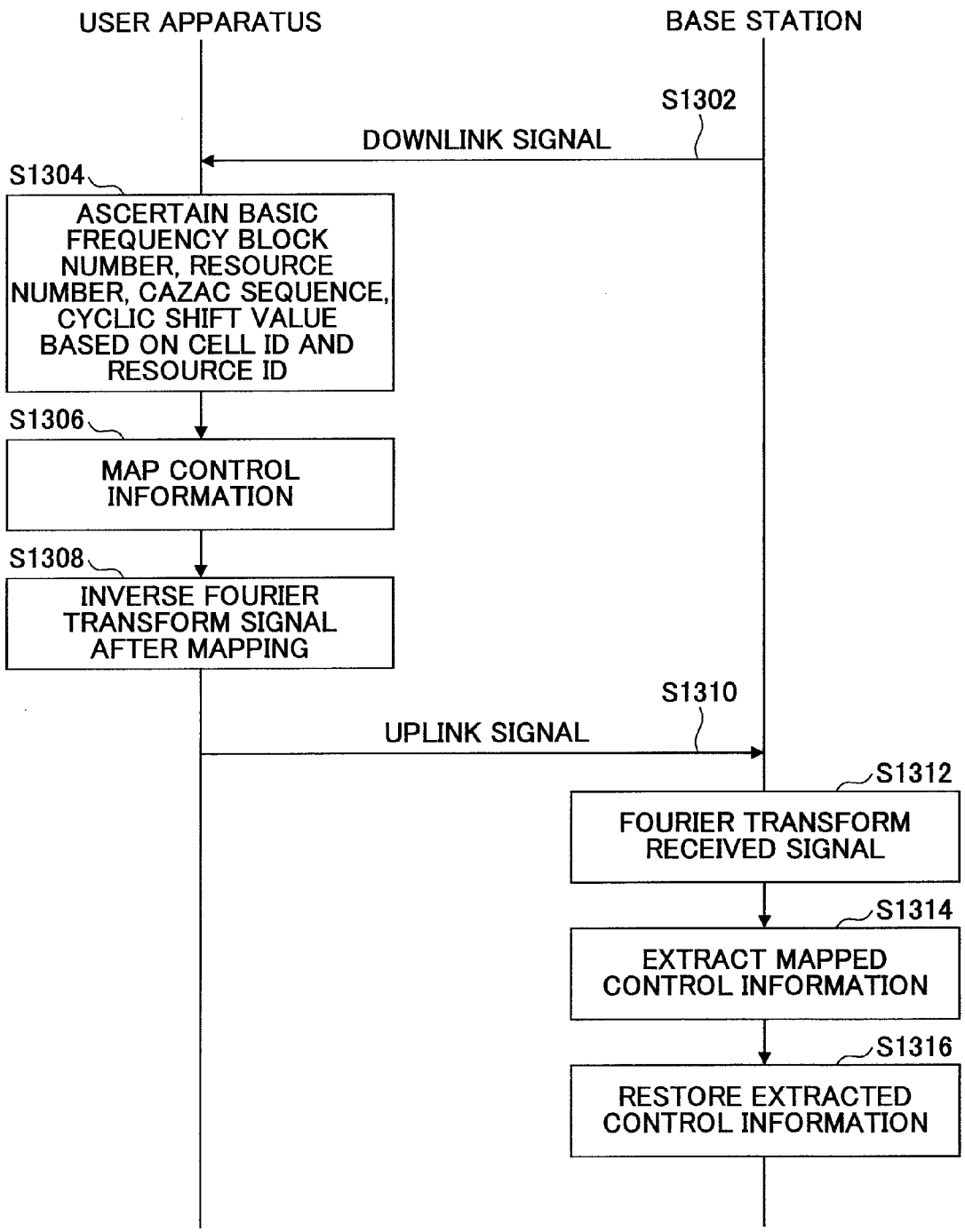
FIG. 13 is a flow diagram showing operation of a mobile communication system according to an embodiment.

Operation of the mobile communication system of the present embodiment is described with reference to FIG. 13.

The base station 200 transmits a downlink signal (step S1302).

The user apparatus 100$_n$ ascertains basic frequency block ID (number), resource number, CAZAC sequence and cyclic shift based on a cell ID and a resource ID (step S1304). For example, the cell ID and the resource ID may be detected based on the downlink signal. For example, the base station may determine the resource ID so as to assign a basic frequency block that has not been assigned. For example, hopping patterns may be set such that radio resources used by each user apparatus do not overlap. In this case, as long as different hopping patterns are used, the same radio resource is not used by a plurality of user apparatuses in the same subframe. In addition, hopping patterns may be configured to be different for each cell.

The user apparatus 100$_n$ maps the control information based on the ascertained basic frequency block ID (number), resource number, CAZAC sequence and cyclic shift (step S1306). In this step, the control information may be spread over a plurality of subcarriers based on the CAZAC sequence and the cyclic shift.

The user apparatus 100$_n$ performs inverse Fourier transform on the mapped signal (step S1308).

The user apparatus 100$_n$ transmits an uplink control channel (step S1310).

The base station 200 performs Fourier transform on the received signal (step S1312).

The base station 200 extracts the mapped control information based on the Fourier transformed received signal (step S1314).

The base station 200 restores the extracted control information (step S1316).

In the above example, although the case where single-carrier transmission is applied and the case multicarrier transmission is applied are described, each of the cases may be used by switching between them according to surrounding environments. The surrounding environments may include cell configuration and propagation status. For example, the cases may be switched according to the location of the user apparatus. More specifically, it is possible that signal-carrier transmission is applied to a user located at the cell edge, and that multicarrier transmission may be applied to a user located in a center region of the cell.

Although a case where the OFDM scheme is applied to the uplink is described mainly, it may be applied not only to the uplink but also to the downlink. The method can be widely applied when transmitting retransmission control information and the channel quality indicator by the multicarrier scheme.

Although the subframe that forms the radio frame includes two slots in the above embodiments, the number of slots may be greater than two, and may be one. In addition, although the bands (first, second control bands) reserved specifically for transmitting control information are prepared one by one in both ends of the system band, any number of such specific control bands may be prepared anywhere in the system bands. However, from the viewpoint of enhancing diversity effect by frequency hopping, it is preferable to use a plurality of control bands that are separated as far as possible on the frequency axis. The frequency hopping may be performed in units of slots, may be performed in units of subframes, or may be performed in units of one or more symbol groups forming a slot (several OFDM symbols, for example). From the viewpoint of reducing overhead in radio transmission, it is preferable that the bandwidth of the control band is narrow as much as possible. The bandwidth of the control band may be changed according to the size of the system bandwidth.

Although the acknowledgement information (ACK/NACK) and/or channel quality information (CQI) are mainly transmitted using the control bands prepared in the both ends of a basic frequency block or a predetermined number of different basic frequency blocks in the above-mentioned embodiments, information other than those may be transmitted using the control bands. For example, a packet number of a packet that is a target of ACK/NACK, puncture pattern, user identification information and the like may be included as retransmission control information. But, from the viewpoint of reporting information to the other party of communication frequently while reducing overhead, it is preferable to limit information transmitted by the specific control band to ACK/NACK and CQI which are particularly important for throughput of the system so as to keep the number of transmitted information bits to be small.

When receiving a control channel and a data channel, it is necessary at least to know which radio resource is used in what way when performing receive processing. Therefore, also when reporting ACK/NACK and CQI to the other party of the communication, it is necessary to report the use method of the radio resource. However, if the radio resource is consumed only for the reporting, overhead becomes large. Thus, from the viewpoint of effective utilization of resources, it is preferable to contrive measures for performing the report efficiently.

(1) As an example of the measures, it can be considered to use information (that is, mapping position of scheduling information) indicating how the scheduling information is included in the downlink control channel. The downlink L1/L2 control channel includes scheduling information of the number of multiplexed users. In the present method, resources are reserved beforehand for the maximum user multiplexing number $N_{CCH\_MAX}$ of pieces of control information. The user apparatus receives the downlink L1/L2 control channel, and extracts scheduling information addressed to the user apparatus. In this case, the user apparatus can check presence or absence of the scheduling information addressed to the user apparatus by performing decoding the maximum user multiplexing number $N_{CCH\_MAX}$ of times at most.

For example, it is assumed that a user apparatus UE finds downlink scheduling information addressed to the user apparatus at x-th decoding. The user apparatus UE receives a downlink data channel using a resource block specified by the downlink scheduling information, and prepares ACK/NACK. The user apparatus UE reports ACK/NACK to the base station by using a resource for control information corresponding to the number x on a one-to-one basis.

In addition, when the user apparatus UE finds uplink scheduling information addressed to the user apparatus at x-th decoding, an uplink data channel is transmitted using a resource block specified by the information. The base station prepares ACK/NACK for the uplink data channel. Then, the base station writes ACK/NACK in a x-th position in the downlink L1/L2 control channel. The user apparatus UE reads the information written at the x-th position so as to be able to know necessity of retransmission. However, it is assumed that the transmission timing of the data channel and the transmission timing of ACK/NACK are known beforehand.

By setting the correspondence relationship beforehand, the user apparatus and the base station can know necessity of retransmission without reporting user identification information and resource information at each time.

(2) In the above example, the mapping position of the control channel is used. Instead of that, a location of a resource block may be used. In this method, resources for the resource block total number $N_{RB\_MAX}$ of pieces of control information are kept beforehand.

For example, in the downlink, it is assumed that an x-th resource block RB_x is assigned to a user apparatus UE. The user apparatus UE restores a data channel of the resource block RB_x, and prepares ACK/NACK. The user apparatus UE reports ACK/NACK to the base station by using a resource for control information corresponding to x on a one-to-one basis.

In addition, in the uplink, it is assumed that a resource block RB_x is assigned to the user apparatus UE. The user apparatus UE transmits an uplink data channel using the resource block RB_x. For the uplink data channel, the base station prepares ACK/NACK. Then, the base station writes ACK/NACK in an x-th position in the downlink L1/L2 control channel. The user apparatus UE reads the information written at the x-th position so as to be able to know necessity of retransmission. Also in this case, it is assumed that the transmission timing of the data channel and the transmission timing of ACK/NACK are known beforehand.

Also, by setting such correspondence relationship beforehand, the user apparatus and the base station can know necessity of retransmission efficiently.

Typically, it can be considered that the CQI feedback information is reported periodically. Thus, in initial transmission or beforehand, information (transmission resource number, transmission cycle, transmission period and the like) necessary for transmitting CQI is signaled using a broadcast channel and the like, and after that, transmission is performed according to the information reported beforehand without signaling, so that the amount of signaling can be reduced.

According to the present embodiment, as to the uplink control channel, frequency hopping can be applied when transmitting control information of a plurality of basic frequency blocks, reception quality in the receiving apparatus can be improved.

As to the uplink control channel, frequency hopping can be applied when transmitting control information of a plurality of basic frequency blocks by applying single-carrier transmission or multicarrier transmission.

The mobile communication system of the present embodiment can be applied to any proper mobile communication system that transmits control information by the single-carrier scheme and/or multicarrier scheme.

As described above, while the present invention is described with reference to specific embodiments, the respective embodiments are merely exemplary, so that a skilled person will understand variations, modifications, alternatives, and replacements. While specific numerical value examples are used to facilitate understanding of the present invention, such numerical values are merely examples, so that any appropriate value may be used unless specified otherwise. For convenience of explanation, while the apparatus according to the embodiments of the present invention is explained using functional block diagrams, such an apparatus as described above may be implemented in hardware, software, or a combination thereof. The present invention is not limited to the above embodiments, so that variations, modifications, alternatives, and replacements are included in the present invention without departing from the spirit of the present invention.

DESCRIPTION OF REFERENCE SIGNS 50 cell
$100_1$, $100_2$, $100_3$ user apparatus
200 base station apparatus
300 upper node
400 core network
102 OFDM signal demodulation unit
104 CQI estimation unit
106 downlink control signal decoding unit
108 ACK/NACK determination unit
110 L1/L2 control signal process block
112 channel coding unit
114 data modulation unit
116 subcarrier mapping unit
118 inverse fast Fourier transform unit (IFFT)
120 guard interval adding unit (CP)
122 pilot signal process block
124 pilot sequence generation unit
126 subcarrier mapping unit
128 inverse fast Fourier transform unit (IFFT)
132 guard interval adding unit
132 multiplexing unit
202 synchronization detection and channel estimation unit
204 guard interval removing unit
206 fast Fourier transform unit (FFT)
208 subcarrier demapping unit
210 data demodulation unit
212 data decoding unit
214 ACK/NACK determination unit
216 scheduler
218 uplink scheduling grant signal generation unit
220 other downlink channel generation unit
222 OFDM signal generation unit
1000 mobile communication system

The invention claimed is:

1. A transmission apparatus for transmitting an uplink signal by using a plurality of basic frequency blocks, wherein a system band is divided into a plurality of bands by a basic frequency block having a predetermined bandwidth, comprising:

a mapping unit configured to map control information to subcarriers in a basic frequency block in a given subframe;

an inverse Fourier transform unit configured to perform inverse Fourier transform on a signal to which the control information is mapped by the mapping unit; and a radio transmission unit configured to transmit a transmission signal, to a receiving apparatus by radio, including a signal on which inverse Fourier transform has been performed by the inverse Fourier transform unit, wherein, in a subframe subsequent to the given subframe, the mapping unit maps the control information to subcarriers in a basic frequency block of a band different from a band of the basic frequency block in the given subframe, wherein, in a basic frequency block in a given subframe, the mapping unit maps the control information to a plurality of bands that are prepared discontinuously in the frequency domain over a period of a subframe and that are prepared separately from a band for a shared data channel.

2. The transmission apparatus as claimed in claim 1, wherein the plurality of bands include a first band and a second band located in bands of ends of the basic frequency block, the subframe includes equal to or more than two unit periods, and first and second control information addressed to the receiving apparatus is transmitted over equal to or more than two unit periods, and the mapping unit maps, to the second band, the first control information addressed to the receiving apparatus in the first unit period, and the mapping unit maps, to the first band, the second control information addressed to the receiving apparatus in the second unit period.

3. The transmission apparatus as claimed in claim 2, wherein the unit period is a slot having a period half a subframe.

4. A transmission apparatus for transmitting an uplink signal by using a plurality of basic frequency blocks, wherein a system band is divided into a plurality of bands by a basic frequency block having a predetermined bandwidth, comprising:

a mapping unit configured to map control information to subcarriers in different basic frequency blocks in a given subframe;

an inverse Fourier transform unit configured to perform inverse Fourier transform on a signal to which the control information is mapped by the mapping unit; and a radio transmission unit configured to transmit a transmission signal, to a receiving apparatus by radio, including a signal on which inverse Fourier transform has been performed by the inverse Fourier transform unit, wherein, in different basic frequency blocks, the mapping unit maps the control information to a plurality of bands that are prepared discontinuously in the frequency domain over a period of a subframe and that are prepared separately from a band for a shared data channel.

5. The transmission apparatus as claimed in claim 4, wherein the plurality of bands include a first band and a second band located in bands of ends of the different basic frequency blocks, the subframe includes equal to or more than two unit periods, and first and second control information addressed to the receiving apparatus are transmitted over equal to or more than two unit periods, the mapping unit maps, to the second band, the first control information addressed to the receiving apparatus in the first unit period, and the mapping unit maps, to the first band, the second control information addressed to the receiving apparatus in the second unit period.

6. The transmission apparatus as claimed in claim 4, wherein, in each basic frequency block, the mapping unit maps the control information to a plurality of bands that are prepared discontinuously in the frequency domain over a period of a subframe and that are prepared separately from a band for the shared data channel.

7. The transmission apparatus as claimed in claim 6, wherein the plurality of bands include a first band and a second band located in bands of ends of the basic frequency block, the subframe includes equal to or more than two unit periods, and first and second control information addressed to the receiving apparatus are transmitted over equal to or more than two unit periods, and the mapping unit maps, to the first band in each basic frequency block, the first control information addressed to the receiving apparatus in the first unit period, and the mapping unit maps, to the second band in each basic frequency block, the second control information addressed to the receiving apparatus in the second unit period.

8. The transmission apparatus as claimed in claim 7, wherein, in a subframe subsequent to the given subframe, the mapping unit maps, to the second band in each basic frequency block, the first control information addressed to the receiving apparatus in the first unit period, and the mapping unit maps, to the first band in each basic frequency block, the second control information addressed to the receiving apparatus in the second unit period.

9. A method in a transmission apparatus for transmitting an uplink signal by using a plurality of basic frequency blocks, wherein a system band is divided into a plurality of bands by a basic frequency block having a predetermined bandwidth, comprising:

a mapping step of mapping control information to subcarriers in a basic frequency block in a given subframe;

an inverse Fourier transform step of performing inverse Fourier transform on a signal to which the control information is mapped by the mapping step; and a radio transmission step of transmitting a transmission signal, to a receiving apparatus by radio, including a signal on which inverse Fourier transform has been performed by the inverse Fourier transform step, wherein, in the mapping step, in a subframe subsequent to the given subframe, the transmission apparatus maps the control information to subcarriers in a basic frequency block of a band different from a band of the basic frequency block in the given subframe, wherein in a basic frequency block in a given subframe, the mapping step maps the control information to a plurality of bands that are prepared discontinuously in the frequency domain over a period of a subframe and that are prepared separately from a band for a shared data channel.

10. A method in a transmission apparatus for transmitting an uplink control signal by using a plurality of basic frequency blocks, wherein a system band is divided into a plurality of bands by a basic frequency block having a predetermined bandwidth, comprising:

a mapping step of mapping control information to subcarriers in different basic frequency blocks in a given subframe;

an inverse Fourier transform step of performing inverse Fourier transform on a signal to which the control information is mapped by the mapping step; and a radio transmission step of transmitting a transmission signal, to a receiving apparatus by radio, including a signal on which inverse Fourier transform has been performed by the inverse Fourier transform step, wherein, in the mapping step, in different basic frequency blocks, the transmission apparatus maps the control information to a plurality of bands that are prepared discontinuously in the frequency domain over a period of a subframe and that are prepared separately from a band for a shared data channel.

11. A receiving apparatus for receiving an uplink signal transmitted by using a plurality of basic frequency blocks, wherein a system band is divided into a plurality of bands by a basic frequency block having a predetermined bandwidth, comprising:
   a Fourier transform unit configured to perform Fourier transform on a received signal;
   a demapping unit configured to extract a signal mapped to each subcarrier based on the signal on which Fourier transform has been performed by the Fourier transform unit; and
   a restoring unit configured to restore control information extracted by the demapping unit,
   wherein, the demapping unit extracts control information mapped to subcarriers in a basic frequency block in a subframe, and
   in a subframe subsequent to the given subframe, the demapping unit extracts control information, mapped to subcarriers in a basic frequency block of a band different from a band of the basic frequency block in the given subframe,
   wherein, in a basic frequency block in a given subframe, the the demapping unit extracts control information mapped to a plurality of bands that are prepared discontinuously in the frequency domain over a period of a subframe and that are prepared separately from a band for a shared data channel.

12. A receiving apparatus for receiving an uplink signal transmitted by using a plurality of basic frequency blocks, wherein a system band is divided into a plurality of bands by a basic frequency block having a predetermined bandwidth, comprising:
   a Fourier transform unit configured to perform Fourier transform on a received signal;
   a demapping unit configured to extract a signal mapped to each subcarrier based on the signal on which Fourier transform has been performed by the Fourier transform unit; and
   a restoring unit configured to restore control information extracted by the demapping unit,
   wherein, in subcarriers in a different basic frequency blocks in a subframe, the demapping unit extracts control information mapped to a plurality of bands that are prepared discontinuously in the frequency domain over a period of a subframe and that are prepared separately from a band for a shared data channel.

13. A method in a receiving apparatus for receiving an uplink signal transmitted by using a plurality of basic frequency blocks, wherein a system band is divided into a plurality of bands by a basic frequency block having a predetermined bandwidth, comprising:
   a Fourier transform step of performing Fourier transform on a received signal;
   a demapping step of extracting a signal mapped to each of a plurality of subcarriers based on the signal on which Fourier transform has been performed by the Fourier transform step; and
   a restoring step of restoring control information extracted by the demapping step,
   wherein, in the demapping step, the receiving apparatus extracts control information mapped to subcarriers in a basic frequency block in a given subframe, and
   in a subframe subsequent to the given subframe, the receiving apparatus extracts control information mapped to subcarriers in a basic frequency block of a band different from a band of the basic frequency block in the given subframe,
   wherein, in a basic frequency block in a given subframe, the the demapping step extracts control information mapped to a plurality of bands that are prepared discontinuously in the frequency domain over a period of a subframe and that are prepared separately from a band for a shared data channel.

14. A method in a receiving apparatus for receiving an uplink signal transmitted by using a plurality of basic frequency blocks, wherein a system band is divided into a plurality of bands by a basic frequency block having a predetermined bandwidth, comprising:
   a Fourier transform step of performing Fourier transform on a received signal;
   a demapping step of extracting a signal mapped to each subcarrier based on the signal on which Fourier transform has been performed by the Fourier transform step; and
   a restoring step of restoring control information extracted by the demapping step,
   wherein, in the demapping step, in subcarriers in basic frequency blocks in a subframe, the receiving apparatus extracts control information mapped to a plurality of bands that are prepared discontinuously in the frequency domain over a period of a subframe and that are prepared separately from a band for a shared data channel.

15. A mobile communication system comprising:
   a transmission apparatus for transmitting an uplink signal by using a plurality of basic frequency blocks, wherein a system band is divided into a plurality of bands by a basic frequency block having a predetermined bandwidth; and a receiving apparatus for receiving the uplink signal,
   the transmission apparatus comprising:
   a mapping unit configured, when mapping control information to subcarriers in a basic frequency block in a given subframe, to map, in a subframe subsequent to the given subframe, the control information to subcarriers in a basic frequency block of a band different from a band of the basic frequency block in the given subframe;
   an inverse Fourier transform unit configured to perform inverse Fourier transform on a signal to which the control information is mapped by the mapping unit; and
   a radio transmission unit configured to transmit a transmission signal, to the receiving apparatus by radio, including a signal on which inverse Fourier transform has been performed by the inverse Fourier transform unit,
   the receiving apparatus comprising:
   a Fourier transform unit configured to perform Fourier transform on a received signal;
   a demapping unit configured, when extracting a signal mapped to each subcarrier based on the signal on which Fourier transform has been performed by the Fourier transform unit, to extract, in subcarriers in a basic frequency block in a given subframe, control information mapped to subcarriers in a basic frequency block of a band different from a band of the basic frequency block in the given subframe; and
   a restoring unit configured to restore control information extracted by the demapping unit, wherein, in a basic frequency block in a given subframe, the mapping unit maps the control information to a plurality of bands that are prepared discontinuously in the frequency domain over a period of a subframe and that are prepared separately from a band for a shared data channel.

16. A mobile communication system comprising: a transmission apparatus for transmitting an uplink signal by using a plurality of basic frequency blocks, wherein a system band is divided into a plurality of bands by a basic frequency block having a predetermined bandwidth; and a receiving apparatus for receiving the uplink signal, the transmission apparatus comprising: a mapping unit configured, when mapping control information to subcarriers in different basic frequency blocks in a given subframe, to map, in different basic frequency blocks, the control information to a plurality of bands that are prepared discontinuously in the frequency domain over a period of a subframe and that are prepared separately from a band for a shared data channel;

an inverse Fourier transform unit configured to perform inverse Fourier transform on a signal to which the control information is mapped by the mapping unit; and a radio transmission unit configured to transmit a transmission signal, to the receiving apparatus by radio, including a signal on which inverse Fourier transform has been performed by the inverse Fourier transform unit, the receiving apparatus comprising:

a Fourier transform unit configured to perform Fourier transform on a received signal;

a demapping unit configured, when extracting a signal mapped to each subcarrier based on the signal on which Fourier transform has been performed by the Fourier transform unit, to extract, in subcarriers in different basic frequency blocks in a subframe, control information mapped to a plurality of bands that are prepared discontinuously in the frequency domain over a period of a subframe and that are prepared separately from a band for the shared data channel; and a restoring unit configured to restore control information extracted by the demapping unit.

\* \* \* \* \*